United States Patent
Okamoto et al.

(10) Patent No.: US 11,524,881 B2
(45) Date of Patent: Dec. 13, 2022

(54) INDUSTRIAL VEHICLE REMOTE OPERATION SYSTEM, REMOTE OPERATION DEVICE, COMPUTER-READABLE STORAGE MEDIUM STORING INDUSTRIAL VEHICLE REMOTE OPERATION PROGRAM, INDUSTRIAL VEHICLE REMOTE OPERATION METHOD, AND INDUSTRIAL VEHICLE

(71) Applicant: KABUSHIKI KAISHA TOYOTA JIDOSHOKKI, Kariya (JP)

(72) Inventors: Hironobu Okamoto, Aichi-ken (JP); Takuma Ono, Aichi-ken (JP); Koji Hika, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 144 days.

(21) Appl. No.: 16/755,445

(22) PCT Filed: Oct. 12, 2018

(86) PCT No.: PCT/JP2018/038197
§ 371 (c)(1),
(2) Date: Apr. 10, 2020

(87) PCT Pub. No.: WO2019/082705
PCT Pub. Date: May 2, 2019

(65) Prior Publication Data
US 2020/0247652 A1 Aug. 6, 2020

(30) Foreign Application Priority Data
Oct. 23, 2017 (JP) .............................. JP2017-204625

(51) Int. Cl.
*B66F 9/075* (2006.01)
*B66F 9/24* (2006.01)
(Continued)

(52) U.S. Cl.
CPC ............ *B66F 9/07581* (2013.01); *B66F 9/24* (2013.01); *G05D 1/0022* (2013.01);
(Continued)

(58) Field of Classification Search
CPC ..... B66F 9/07581; B66F 9/24; G05D 1/0022; G05D 1/0214; G05D 1/0223; G05D 2201/0216
See application file for complete search history.

(56) References Cited

U.S. PATENT DOCUMENTS 8,155,832 B2 * 4/2012 Aoki ....................... G06F 3/016
701/36
2011/0166721 A1 7/2011 Castaneda et al.
(Continued)

FOREIGN PATENT DOCUMENTS

JP 2002-104800 A 4/2002
JP 2011-214485 A 10/2011
(Continued)

OTHER PUBLICATIONS

Communication dated Nov. 17, 2020 by the European Patent Office in application No. 18871099.0.

*Primary Examiner* — Jess Whittington
(74) *Attorney, Agent, or Firm* — Sughrue Mion, PLLC

(57) ABSTRACT

An industrial vehicle remote operation system includes a forklift truck that includes a vehicle communication unit, a remote operation device that includes a remote communication unit performing wireless communication with the vehicle communication unit and is used for remotely operating the industrial vehicle, and a forced stop control unit
(Continued)

configured to decelerate and forcibly stop traveling of the industrial vehicle while maintaining a steering angle of the industrial vehicle formed when a forced stop condition is met, in a case where the forced stop condition is met during a remote operation of traveling of the industrial vehicle using the remote operation device.

11 Claims, 13 Drawing Sheets

(51) Int. Cl.
    *G05D 1/00*         (2006.01)
    *G05D 1/02*         (2020.01)
(52) U.S. Cl.
    CPC ......... *G05D 1/0214* (2013.01); *G05D 1/0223* (2013.01); *G05D 2201/0216* (2013.01)

(56) References Cited

U.S. PATENT DOCUMENTS

| | | | |
|---|---|---|---|
| 2013/0297151 | A1 | 11/2013 | Castaneda et al. |
| 2014/0195121 | A1* | 7/2014 | Castaneda ............. G05D 1/024 |
| | | | 701/41 |
| 2017/0017392 | A1* | 1/2017 | Castaneda ................. G06F 3/02 |
| 2017/0048707 | A1* | 2/2017 | Ortiz ..................... H04W 12/06 |
| 2018/0002892 | A1 | 1/2018 | Uemura et al. |
| 2019/0356739 | A1* | 11/2019 | Hart ................... G05B 19/0428 |

FOREIGN PATENT DOCUMENTS

| | | |
|---|---|---|
| JP | 2012-236700 A | 12/2012 |
| JP | 2014-069726 A | 4/2014 |
| JP | 2016-160649 A | 9/2016 |
| WO | 2012115920 A2 | 8/2012 |

* cited by examiner

FIG. 3

| Signal | Communication standard | Travel operation information D1 | | | Load-handling operation information D2 | | |
|---|---|---|---|---|---|---|---|
| | | Travel speed information | Acceleration information | Steering angle information | Lift information | Reach information | Tilt information |
| Remote operation signal SG1 | Wireless communication standard | | | | | | |
| Control signal SGa | In-vehicle communication standard | Dv | Dα | Dθ | Dfa | Dfb | Dfc |

FIG. 4

| Control mode | | Remote operation |
|---|---|---|
| Operation modes | Travel mode | ○ |
| | Lift mode | |
| | Reach mode | |
| | Tilt mode | |
| Forced stop mode | | × |
| In-stop mode | | × |

INDUSTRIAL VEHICLE REMOTE OPERATION SYSTEM, REMOTE OPERATION DEVICE, COMPUTER-READABLE STORAGE MEDIUM STORING INDUSTRIAL VEHICLE REMOTE OPERATION PROGRAM, INDUSTRIAL VEHICLE REMOTE OPERATION METHOD, AND INDUSTRIAL VEHICLE

CROSS-REFERENCE TO RELATED APPLICATIONS

This application is a National Stage of International Application No. PCT/JP2018/038197 filed on Oct. 12, 2018, claiming priority based on Japanese Patent Application No. 2017-204625 filed on Oct. 23, 2017, the contents of all of which are incorporated herein by reference in their entirety.

TECHNICAL FIELD

The present invention relates to an industrial vehicle remote operation system, a remote operation device, a computer-readable storage medium storing an industrial vehicle remote operation program, an industrial vehicle remote operation method, and an industrial vehicle.

BACKGROUND ART

Patent Document 1 describes that a remote control device which is a remote operation device for remotely operating a forklift truck as an industrial vehicle remotely operates load-handling work of the forklift truck from a position away from the forklift truck.

CITATION LIST

Patent Document

Patent Document 1: Japanese Patent Application Publication No. 2002-104800

SUMMARY OF INVENTION

Technical Problem

In a configuration which remotely operates an industrial vehicle using a remote operation device herein, traveling of the industrial vehicle may be continued even in a situation inappropriate for remote operation, for example. When traveling under such an inappropriate situation is continued, the safety may be lowered.

The present invention has been made in view of the above-described circumstances. An object of the present invention is to provide an industrial vehicle remote operation system, a remote operation device, a computer-readable storage medium storing an industrial vehicle remote operation program, and an industrial vehicle remote operation method, and an industrial vehicle each of which may improve safety.

Solution to Problem

An industrial vehicle remote operation system which achieves the above object includes: an industrial vehicle that includes a vehicle communication unit; a remote communication device that includes a remote communication unit performing wireless communication with the vehicle communication unit, and is used for remotely operating the industrial vehicle; and a forced stop control unit configured to decelerate and forcibly stop traveling of the industrial vehicle while maintaining a steering angle of the industrial vehicle formed when a forced stop condition is met, in a case where the forced stop condition is met during a remote operation of traveling of the industrial vehicle using the remote operation device.

According to the configuration, the industrial vehicle is forcibly stopped when the forced stop condition is met while the industrial vehicle is traveling. With this configuration, continuation of traveling of the industrial vehicle in an inappropriate situation for remote operation is prevented, and therefore the safety is improved.

The industrial vehicle herein travels for a braking distance from a start of the forced stop until completion of the forced stop. In this case, safety may be lowered when the industrial vehicle travels in a direction not intended by an operator.

In contrast, according to the configuration, the industrial vehicle decelerates and stops while maintaining the steering angle of the industrial vehicle formed when the forced stop condition is met. With this configuration, the industrial vehicle is expected to travel along a trajectory assumed by the operator even during the forced stop control. Accordingly, it is possible to prevent traveling of the industrial vehicle in a direction not intended by the operator during the forced stop of the industrial vehicle.

The industrial vehicle remote operation system described above preferably includes a remote operation control unit configured to control such that a remote operation corresponding to an operation performed for the remote operation device is not performed during the forced stop control.

According to the configuration, the remote operation corresponding to the operation performed for the remote operation device is not performed during the forced stop control. Accordingly, inconveniences caused by the remote operation again performed during the forced stop control, such as instability of behaviors of the industrial vehicle, may be reduced.

According to the industrial vehicle remote operation system described above, the remote operation control unit preferably continues the state where the remote operation corresponding to the operation performed for the remote operation device is not performed until a remote operation start condition is met after an end of the forced stop control.

According the configuration, the state where the remote operation is not performed is continued until the remote operation start condition is met after the end of the forced stop control. The configuration reduces such an inconvenience that the remote operation is performed after execution of the forced stop control even in a state where an event which triggered the forced stop control has not been resolved, for example.

According to the industrial vehicle remote operation system described above, the remote operation control unit preferably includes a determination unit configured to determine whether or not a remote operation start condition is met during the forced stop control. When the determination unit determines that the remote operation start condition is met during the forced stop control, the remote operation control unit preferably performs the remote operation corresponding to the operation performed for the remote operation device after an end of the forced stop control. When the determination unit determines that the remote operation start condition is not met during the forced stop control, the remote operation control unit preferably continues the state where the remote operation corresponding to the operation performed for the remote operation device is not performed after an end of the forced stop control.

According to the configuration, execution of the remote operation corresponding to the operation performed for the remote operation device is permitted after an end of the forced stop control when the remote operation start condition is met during the forced stop control. On the other hand, when the remote operation start condition is not met during the forced stop control, the state where the remote operation corresponding to the operation on the remote operation device is not performed is continued even after the forced stop control is ended. The configuration may eliminate an inconvenience that the remote operation is not performed even in a state where the remote operation start condition is met during the forced stop control.

According to the industrial vehicle remote operation system described above, the remote operation control unit preferably performs the remote operation corresponding to the operation performed for the remote operation device when a start operation is performed for the remote operation device in such a situation that the state where the remote operation corresponding to the operation performed for the remote operation device is not performed continues after the end of the forced stop control.

According to the configuration, the remote operation is re-started by performing the start operation for the remote operation device after the forced stop control. In this manner, the remote operation may be re-started as necessary.

According to the industrial vehicle remote operation system described above, the forced stop control unit is preferably provided on the remote operation device, and transmits, to the vehicle communication unit using the remote communication unit, a forced stop remote operation signal that includes settings of at least either a forced stop speed or a forced stop deceleration, and the steering angle of the industrial vehicle formed when the forced stop condition is met. When the vehicle communication unit receives the forced stop remote operation signal, the industrial vehicle preferably performs a forced stop based on the setting of at least either the forced stop speed or the forced stop deceleration included in the forced stop remote operation signal, and on the steering angle.

According to the configuration, the industrial vehicle may move in accordance with the forced stop remote operation signal, and the configuration does not require a special process to be executed for the forced stop while maintaining the steering angle. With this configuration, the necessity of modification or the like for executing such special process for the industrial vehicle is eliminated, and the versatility is improved.

According to the industrial vehicle remote operation system described above, the remote operation device preferably includes a steering angle storage unit that stores the steering angle of the industrial vehicle formed when the forced stop condition is met. The forced stop control unit preferably transmits the forced stop remote operation signal that includes the setting of the steering angle stored in the steering angle storage unit under the forced stop control.

According to the configuration, there is no necessity of waiting for transmission of information associated with the current steering angle from the industrial vehicle before performing the forced stop control, so that the forced stop control may be executed in an early stage after the forced stop condition is met. The configuration therefore reduces the period from the time when the forced stop condition is met until completion of the forced stop of the industrial vehicle.

According to the industrial vehicle remote operation system described above, the forced stop control unit is preferably provided on the industrial vehicle, and decelerates and forcibly stops traveling of the industrial vehicle while maintaining a current steering angle based on a state that the forced stop condition is met.

According to the configuration, since the forced stop control unit is provided on the industrial vehicle, the industrial vehicle may be forcibly stopped without the communication between the both communication units, after the forced stop condition is met. In this manner, the industrial vehicle may be forcibly stopped even in a situation of a communication failure.

The industrial vehicle remote operation system described above preferably further includes a remote operation control unit configured to start a remote operation of the industrial vehicle using the remote operation device based on a state where a first start operation and a second start operation are performed for the remote operation device. The forced stop condition is preferably a condition that at least either a first continuous operation continued from the first start operation performed when the remote operation is started, or a second continuous operation continued from the second start operation performed when the remote operation is started is no longer performed.

According to the configuration, the remote operation is started based on a state where the first start operation and the second start operation are performed. In addition, the forced stop control is performed based on a state where at least either the first continuous operation or the second continuous operation is no longer performed. With this configuration, the industrial vehicle is forcibly stopped by an erroneous inexecution of at least either the first continuous operation or the second continuous operation, so that the safety is improved. In addition, an intentional forced stop of the industrial vehicle may be achieved by intentionally prohibiting execution of at least either the first continuous operation or the second continuous operation, for example. With this configuration, execution of the forced stop is facilitated, and the operability is improved.

According to the industrial vehicle remote operation system described above, the remote operation device preferably includes a touch panel, a touch sensor configured to detect an input operation to the touch panel, and a display control unit configured to display an operation image on the touch panel. The operation image preferably has a first area and a second area disposed at different positions. The first start operation is preferably an input operation to an inside of the first area. The first continuous operation is preferably an input operation to the touch panel and continued from an input operation to the inside of the first area when the remote operation is started. The second start operation is preferably an input operation to an inside of the second area. The second continuous operation is preferably an input operation to the touch panel and continued from an input operation to the inside of the second area when the remote operation is started.

The configuration requires an input operation to each of targeted locations, i.e., the first area and the second area that are disposed at different positions of the touch panel to start the remote operation. It is therefore assumed that the operator holds the remote operation device with both hands to perform an input operation to each of the two different positions. Accordingly, the configuration prevents a remote operation with one hand and, therefore, prevents a simultaneous operation of a remote operation and a different work.

Further, according to the configuration, forced stop control is executed only by releasing a finger or the like from the touch panel, for example. In this case, the industrial vehicle is forcibly stopped when the finger is released from the touch panel to execute a different work during the remote operation, for example, so that execution of a different work during the remote operation may be reduced. In addition, since the forced stop is achievable only by releasing the finger from the touch panel, an intentional forced stop may be easily and quickly performed.

According to the industrial vehicle remote operation system described above, the touch panel preferably has a shape that has a longer direction and a shorter direction. The first area and the second area are preferably so disposed as to be opposite to each other in the longer direction of the touch panel.

According to the configuration, both the areas are so disposed as to be opposite to each other in the longer direction of the touch panel, so that input operations to both the areas with one hand is complicated. In addition, even when a plurality of fingers of one hand accidentally touch the touch panel, an input operation is unlikely to be made to both the areas. With this configuration, therefore, the safety is improved.

According to the industrial vehicle remote operation system described above, the remote operation device is preferably a smartphone or a tablet terminal. According to the configuration, a remote operation of the industrial vehicle may be realized using an existing general-purpose product.

A remote operation device achieving the above object is used for remotely controlling an industrial vehicle having a vehicle communication unit. The remote operation device includes: a remote communication unit configured to perform wireless communication with the vehicle communication unit; and a forced stop control unit configured to decelerate and forcibly stop traveling of the industrial vehicle while maintaining a steering angle of the industrial vehicle formed when a forced stop condition is met, in a case where the forced stop condition is met during a remote operation of traveling of the industrial vehicle.

A computer-readable storage medium storing an industrial vehicle remote operation program achieving the above object is a storage medium used for remotely operating an industrial vehicle having a vehicle communication unit, and the remote operation is performed by using a remote operation device that includes a remote communication unit performing wireless communication with the vehicle communication unit. In the a computer-readable storage medium storing the industrial vehicle remote operation program, the remote operation device or the industrial vehicle functions as a forced stop control unit configured to decelerate and forcibly stop traveling of the industrial vehicle while maintaining a steering angle of the industrial vehicle formed when a forced stop condition is met, in a case where the forced stop condition is met during a remote operation of traveling of the industrial vehicle using the remote operation device.

An industrial vehicle remote operation method achieving the above object is a method for remotely operating an industrial vehicle by using a remote operation device that includes a remote communication unit performing wireless communication with a vehicle communication unit provided on the industrial vehicle. The industrial vehicle remote operation method is characterized in that the industrial vehicle remote operation method includes a forced stop control step in which the remote operation device or the industrial vehicle decelerates and forcibly stops traveling of the industrial vehicle while maintaining a steering angle of the industrial vehicle formed when a forced stop condition is met, in a case where the forced stop condition is met during a remote operation of traveling of the industrial vehicle using the remote operation device.

An industrial vehicle achieving the above object is an industrial vehicle that includes a vehicle communication unit configured to perform wireless communication with a remote communication unit provided on a remote operation device and is remotely operated by the remote operation device. The industrial vehicle includes a forced stop control unit configured to decelerate and forcibly stop traveling of the industrial vehicle while maintaining a steering angle of the industrial vehicle formed when a forced stop condition is met, in a case where the forced stop condition is met during a remote operation of traveling of the industrial vehicle using the remote operation device.

According to the respective configurations described above, the industrial vehicle is forcibly stopped when the forced stop condition is met while the industrial vehicle is traveling. With this configuration, continuation of traveling of the industrial vehicle in an inappropriate situation for remote operation is prevented, and therefore the safety is improved. Further, according to the above configurations, the industrial vehicle decelerates and stops while maintaining the steering angle formed when the forced stop condition is met. With this configuration, the industrial vehicle is expected to travel along a trajectory assumed by the operator even during the forced stop control. Accordingly, it is possible to prevent traveling of the industrial vehicle in a direction not intended by the operator during the forced stop of the industrial vehicle.

Advantageous Effects of Invention

According to the present invention, the safety may be improved.

BRIEF DESCRIPTION OF DRAWINGS

FIG. 3 is a conceptual diagram for explaining a remote operation signal and a control signal.

FIG. 4 is a conceptual diagram for explaining various modes set for an industrial vehicle remote operation system of a first embodiment.

DESCRIPTION OF EMBODIMENTS

First Embodiment

An industrial vehicle remote operation system according to a first embodiment will be hereinafter described.

Figure 1:
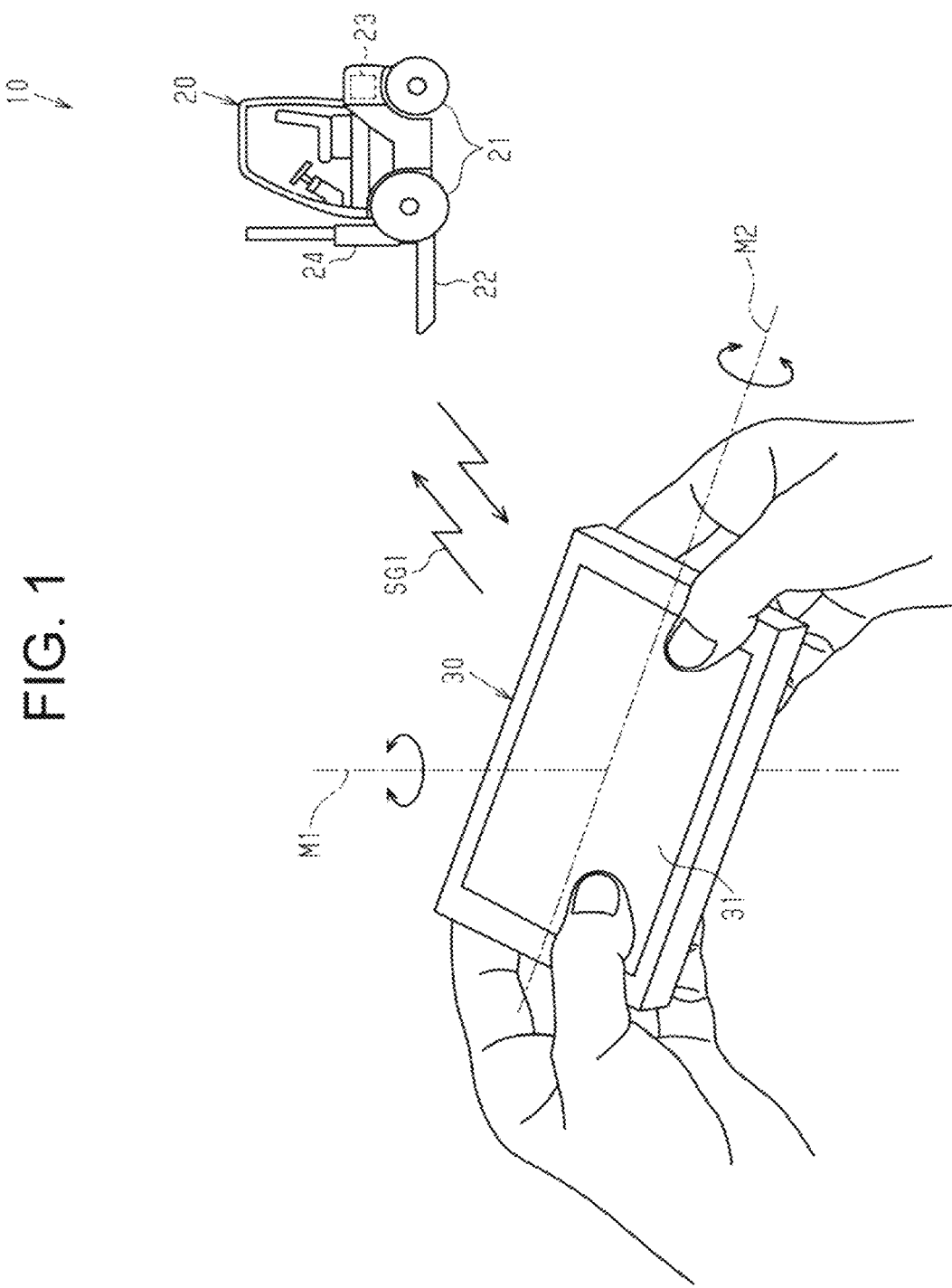
FIG. 1 is a schematic view of an industrial vehicle remote operation system.

As shown in FIG. 1, an industrial vehicle remote operation system 10 includes a forklift truck 20 which is an industrial vehicle, and a remote operation device 30 used for remote operation of the forklift truck 20.

The forklift truck 20 includes wheels 21, and forks 22 as a load-handling device for loading or unloading loads. The forklift truck 20 according to the present embodiment is configured such that a driver is allowed to sit on a seat during driving. The forks 22 are configured to perform a lifting motion, a reaching motion, and a tilting motion.

For example, the forklift truck 20 may be of an engine type equipped with an engine, an EV type equipped with a power storage device and an electric motor, or an FCV type equipped with a fuel cell and an electric motor. Alternatively, for example, the forklift truck 20 may be of an HV type that includes an engine, a power storage device, and an electric motor.

Figure 2:
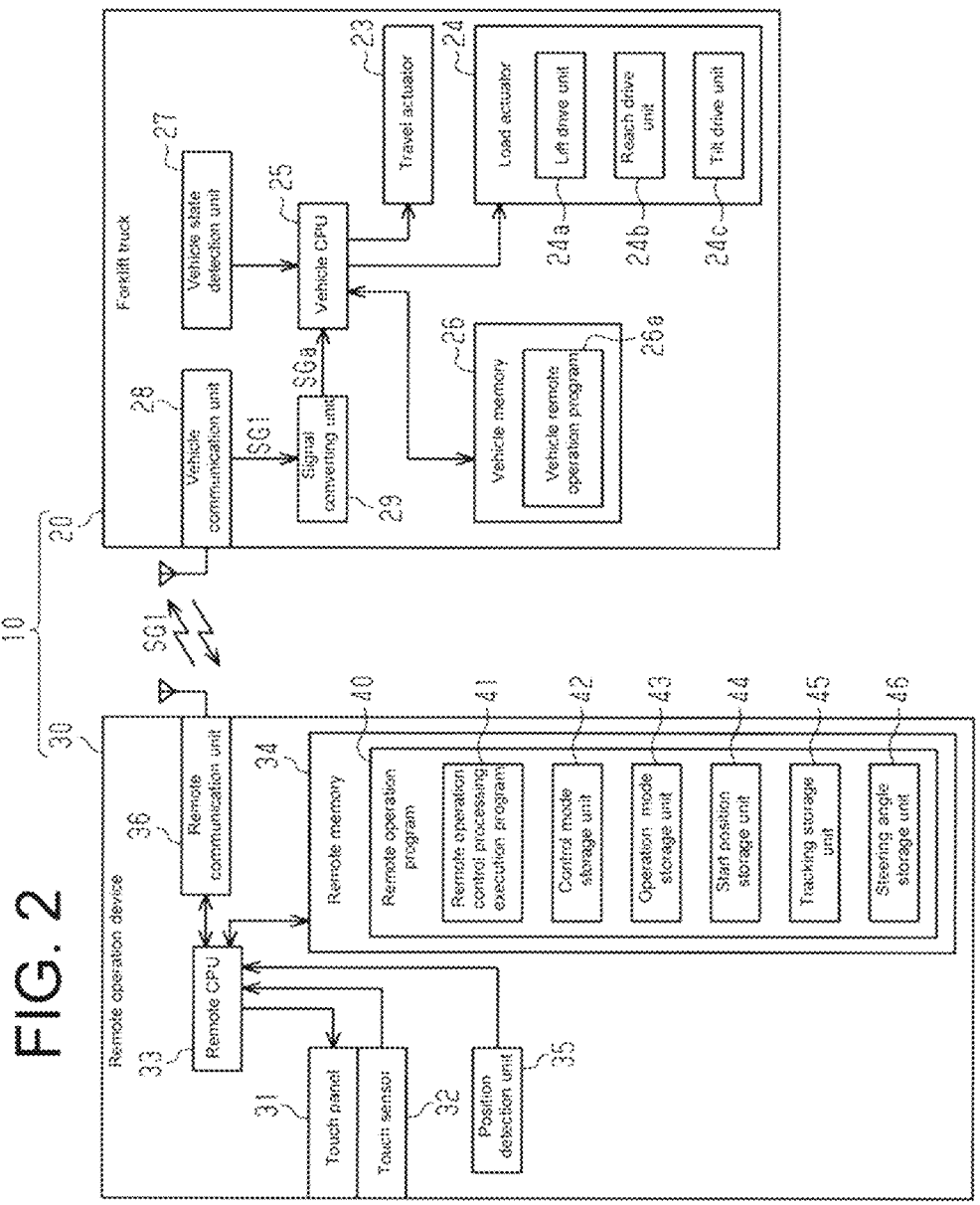
FIG. 2 is a block diagram showing an electrical configuration of the industrial vehicle remote operation system.

As shown in FIG. 2, the forklift truck 20 includes a travel actuator 23, a load actuator 24, a vehicle CPU 25 which controls the travel actuator 23 and the load actuator 24, a vehicle memory 26, and a vehicle state detection unit 27.

The travel actuator 23 which is a travel drive unit is used for traveling of the forklift truck 20, specifically for rotating and driving the wheels 21 and changing a steering angle (traveling direction). The travel actuator 23 is constituted by an engine, a steering device, and the like when the forklift truck 20 is of an engine type, for example. The travel actuator 23 is constituted by an electric motor for rotating and driving the wheels 21, a steering device, and the like when the forklift truck 20 is of an EV type, for example.

The load actuator 24 is used for performing a motion different from traveling, specifically for driving the forks 22. For example, the load actuator 24 includes a lift drive unit 24a which performs a lifting motion for shifting the forks 22 in an up-down direction, a reach drive unit 24b which performs a reaching motion for shifting the forks 22 in a front-rear direction, and a tilt drive unit 24c which performs a tilting motion for tilting the forks 22.

The forks 22 are also considered as the target of motion that performs a motion that is different from traveling. The motion of the forks 22 is also considered as a "motion different from traveling". The load actuator 24 is also considered as an "drive unit for motions" used for a motion other than traveling.

The vehicle state detection unit 27 is configured to detect a state of the forklift truck 20. For example, the vehicle state detection unit 27 detects a current traveling manner of the forklift truck 20 and a current manner of motion of the forks 22, and also detects the presence or absence of an abnormality of the forklift truck 20, and outputs, to the vehicle CPU 25, a detection signal which includes settings of travel information, motion information, and abnormality information as results of the detection.

For example, the travel information includes information associated with a travel speed, an acceleration, and a steering angle of the forklift truck 20. In other words, the vehicle state detection unit 27 of the present embodiment detects at least the travel speed, the acceleration, and the steering angle of the forklift truck 20 as the traveling manner of the forklift truck 20. The motion information includes information associated with a position of the forks 22 in the up-down direction (lift position) and a motion speed during the lifting motion, information associated with a position of the forks 22 in the front-rear direction (reach position) and a motion speed during the reaching motion, and information associated with a tilt angle of the forks 22 with respect to the vertical direction and a motion speed during the tilting motion. In other words, the manner of motion of the forklift truck 20 detected by the vehicle state detection unit 27 of the present embodiment includes the lifting motion, the reaching motion, and the tilting motion.

Examples of the abnormality of the forklift truck 20 include an abnormality of the travel actuator 23 or the load actuator 24, and an abnormality of the wheels 21. However, the abnormality of the forklift truck 20 is not limited to these examples. When the forklift truck 20 includes a power storage device, for example, the abnormality may include an abnormality of the power storage device and others.

The vehicle CPU 25 reads out and executes various programs stored in a vehicle memory 26 in accordance with an operation of a steering device or various operation levers provided on the forklift truck 20 to control the travel actuator 23 and the load actuator 24. Accordingly, the forklift truck 20 of the present embodiment is also operable not by using the remote operation device 30, but by using the steering device or the various operation levers provided on the forklift truck 20. The vehicle CPU 25 further determines a current state of the forklift truck 20 based on a detection signal input from the vehicle state detection unit 27. The vehicle CPU 25 is also considered as a vehicle ECU and a vehicle MPU.

The remote operation device 30 is an operation terminal having a communication function. The remote operation device 30 is a general-purpose product such as a smartphone or a tablet terminal. However, the remote operation device 30 is not limited to these examples, and may be a cellular phone or a virtual reality terminal, or may be a product dedicated for remote operations.

As shown in FIG. 1, the remote operation device 30 of the present embodiment has a rectangular plate shape having a longer direction in one direction and a shorter direction in the other direction. During a remote operation, the remote operation device 30 is used in such a state that one of opposite ends of the remote operation device 30 in the longer direction is held by a right hand, and that the other end is held by a left hand. Accordingly, it is assumed that the remote operation device 30 is held horizontally with both hands during a remote operation.

As shown in FIG. 2, the remote operation device 30 includes a touch panel 31, a touch sensor 32, a remote CPU 33, a remote memory 34, and a position detection unit 35.

As shown in FIG. 1, the touch panel 31 is formed on one plate surface of the remote operation device 30. The touch panel 31 has a rectangular shape having a longer direction and a shorter direction. The longer direction of the touch panel 31 is aligned with the longer direction of the remote operation device 30. The touch panel 31 is configured to display a desired image.

When the remote operation device 30 is held lengthways, the shorter direction of the touch panel 31 corresponds to the up-down direction or the front-rear direction as viewed from an operator. In this case, the longer direction of the touch panel 31 corresponds to the left-right direction as viewed from the operator.

In the following description, the upper end side of the touch panel 31 (upward direction in FIG. 5 and FIG. 6) as viewed from the operator is defined as the upper side, while the lower end side (downward direction in FIG. 5 and FIG. 6) as viewed from the operator is defined as the lower side, in a state where the remote operation device 30 is held lengthways in a manner allowing visual recognition of the touch panel 31.

The touch sensor 32 detects an input operation (specifically, tap operation or swipe operation) input to the touch panel 31, as a type of operation performed for the remote operation device 30. Specifically, the touch sensor 32 detects whether or not a finger is in contact with the touch panel 31, and detects a position of the contact when the contact of the finger is detected. Thereafter, the touch sensor 32 outputs a detection result to the remote CPU 33. In this manner, the remote CPU 33 determines an input operation to the touch panel 31. A specific configuration of the touch sensor 32 may be any configuration. For example, the touch sensor 32 may be a capacitance sensor achieving detection based on a change in capacitance, a pressure sensor, or other sensors.

The touch sensor 32 of the present embodiment individually detects each input operation when a plurality of input operations are input to the touch panel 31. For example, when both the left finger and the right hand finger are in contact with the touch panel 31, both the contact positions of the left hand finger and the contact position of the right hand finger are individually detected. The detection result thus obtained is output to remote CPU 33.

The position detection unit 35 detects a position of the remote operation device 30. The position detection unit 35 includes a three-axis acceleration sensor and a three-axis gyro sensor, for example, and detects a direction and a change of the remote operation device 30 based on information obtained from these sensors.

For example, when the opposite ends of the remote operation device 30 in the longer direction are held by the operator as shown in FIG. 1, the position detection unit 35 detects a rotation operation (hereinafter simply referred to as "first rotation operation") having a rotation axis corresponding to a first centerline M1 which passes through the center of the remote operation device 30 and extends in a thickness direction of the remote operation device 30. The position detection unit 35 further detects a rotation operation (hereinafter simply referred to as "second rotation operation") having a rotation axis corresponding to a second centerline M2 which passes through the center of the remote operation device 30 and extends in the longer direction of the remote operation device 30.

A first rotation operation direction is a rotation direction of the remote operation device 30 about a rotation axis extending in the thickness direction of the remote operation device 30, while a second rotation operation direction is a rotation direction of the remote operation device 30 about a rotation axis extending in the longer direction of the remote operation device 30. In other words, the position detection unit 35 detects a change in the rotation position of the remote operation device 30 in the first rotation operation direction, and a change in the rotation position of the remote operation device 30 in the second rotation operation direction.

The position detection unit 35 detects whether or not at least either the first rotation operation or the second rotation operation is performed, and detects a manner of the rotation operation and outputs a result of the detection to the remote CPU 33 when at least one of the two rotation operations is performed. In this manner, the remote CPU 33 determines the first rotation operation and the second rotation operation each corresponding to a type of operations performed for the remote operation device 30.

The manner of the rotation operation is a level of change of an angular speed of the rotation operation, for example. Specifically, the position detection unit 35 detects an angular acceleration as a manner of the rotation operation. In this manner, the remote operation device 30 (specifically, the remote CPU 33) determines the angular acceleration in addition to the presence or absence of the rotation operation.

The remote CPU 33 executes various processes using various programs stored in the remote memory 34. Specifically, the remote memory 34 stores a program associated with image control of the touch panel 31. The remote CPU 33 performs display control of the touch panel 31 by reading out and executing this program. The remote CPU 33 further determines various operations performed for the remote operation device 30 based on signals input from the touch sensor 32 and the position detection unit 35. According to the present embodiment, the remote CPU 33 corresponds to a "display control unit".

As shown in FIG. 2, the forklift truck 20 and the remote operation device 30 are configured to communicate with each other. Specifically, the forklift truck 20 has a vehicle communication unit 28, while the remote operation device 30 has a remote communication unit 36 capable of communicating with the vehicle communication unit 28.

Each of the vehicle communication unit 28 and the remote communication unit 36 is a communication interface performing wireless communication, for example. When the forklift truck 20 paired (registered) with the remote communication unit 36 is present within a communication range, the remote communication unit 36 establishes a communication connection with the vehicle communication unit 28 of the corresponding forklift truck 20. As a result, signals become exchangeable between the remote operation device 30 and the forklift truck 20.

According to the present embodiment, the communication format between the vehicle communication unit 28 and the remote communication unit 36 is Wi-Fi (i.e., wireless LAN of the IEEE 802.11 standard). Both the communication units 28 and 36 transmit and receive signals by packet communication.

Note that there are a plurality of standards such as IEEE802.11a and IEEE802.11ac for Wi-Fi. The communication format between the vehicle communication unit 28 and the remote communication unit 36 may be any of the plurality of above standards. In addition, transmission and reception of signals by both the communication units 28 and 36 is not limited to packet communication and may be any type of communication.

Furthermore, the communication format between the vehicle communication unit 28 and the remote communication unit 36 is not limited to Wi-Fi, and may be any type of communication, such as Bluetooth (registered trademark) and Zigbee (registered trademark).

The remote CPU 33 is electrically connected to the remote communication unit 36. The remote CPU 33 remotely operates the forklift truck 20 by transmitting, to the vehicle communication unit 28 using the remote communication unit 36, a remote operation signal SG1 which includes settings of various types of information associated with remote operations. The remote operation signal SG1 is a signal corresponding to a standard for wireless communication, and is a packet communication signal corresponding to a Wi-Fi standard according to the present embodiment.

The forklift truck 20 includes a signal converting unit 29 which converts the remote operation signal SG1 into a control signal SGa corresponding to an in-vehicle communication standard. The signal converting unit 29 electrically connected to the vehicle communication unit 28 and the vehicle CPU 25 converts the remote operation signal SG1 received by the vehicle communication unit 28 into the control signal SGa recognizable by the vehicle CPU 25, and outputs the converted control signal SGa to the vehicle CPU 25.

According to the present embodiment, the specific in-vehicle communication standard of the forklift truck 20 is CAN standard. Accordingly, the control signal SGa of the present embodiment is a CAN signal. However, the in-vehicle communication standard is not limited to this example and may be any standards.

As shown in FIG. 3, the remote operation signal SG1 and the control signal SGa have different signal formats (i.e., signal forms) due to the different standards of the remote operation signal SG1 and the standard of the control signal SGa. However, the remote operation signal SG1 and the control signal SGa include a setting of the same information (i.e., contents). In other words, the signal converting unit 29 is considered as a unit which converts the wireless communication standard remote operation signal SG1 which includes a setting of the information associated with a remote operation into the control signal SGa recognizable by the vehicle CPU 25 while retaining the information associated with the remote operation.

Each of the remote operation signal SG1 and the control signal SGa includes, as information associated with a remote operation, traveling operation information D1 associated with a traveling operation, and load-handling operation information D2 associated with a load-handling operation.

For example, the traveling operation information D1 includes travel speed information Dv which includes a setting of a traveling speed of the forklift truck 20, acceleration information Dα which includes a setting of an acceleration of the forklift truck 20, and steering angle information Dθ which includes a setting of a steering angle of the forklift truck 20.

For example, the load-handling operation information D2 includes lift information Dfa which includes a setting of a stroke amount of the lifting motion, reach information Dfb which includes a setting of a stroke amount of the reaching motion, and tilt information Dfc which includes a setting of a tilt angle of the tilting motion.

When receiving the control signal SGa from the signal converting unit 29, the vehicle CPU 25 reads out a vehicle remote operation program 26a stored in the vehicle memory 26, and executes the vehicle remote operation program 26a to drive the forklift truck 20 (specifically, both the actuators 23 and 24) in a manner corresponding to the signal SGa.

For example, suppose that the control signal SGa indicating a numerical value other than "0" as each of the information Dv, Dα, and Dθ included in the traveling operation information D1, and indicating "0" or "null" as each of the information Dfa, Dfb, and Dfc included in the load-handling operation information D2 is input to the vehicle CPU 25. In this case, the vehicle CPU 25 controls the travel actuator 23 to achieve acceleration or deceleration at the acceleration included in the acceleration information Dα and such that a traveling speed included in the travel speed information Dv is obtained, and changes the steering angle of the forklift truck 20 to the steering angle included in the steering angle information Dθ.

In addition, when the control signal SGa indicating a numerical value other than "0" as the lift information Dfa, and indicating "0" or "null" as other information is input to the vehicle CPU 25, for example, the vehicle CPU 25 controls the load actuator 24 such that the forks 22 shift in the up-down direction by the stroke amount represented by the numerical value included in the lift information Dfa.

For example, the lift information Dfa is numerical information which possibly indicates either a positive (+) value or a negative (−) value. When the lift information Dfa indicates a positive value, the vehicle CPU 25 controls the load actuator 24 (specifically, the lift drive unit 24a) so that the forks 22 shift upward by the stroke amount represented by the numerical value included in the lift information Dfa. On the other hand, when the lift information Dfa indicates a negative value, the vehicle CPU 25 controls the load actuator 24 (specifically, the lift drive unit 24a) so that the forks 22 shift downward by the stroke amount represented by the numerical value included in the lift information Dfa.

Similarly, the reach information Dfb is numerical information which possibly indicates either a positive (+) value or a negative (−) value. When the reach information Dfb indicates a positive value, the vehicle CPU 25 controls the load actuator 24 (specifically, the reach drive unit 24b) so that the forks 22 shift frontward by the stroke amount represented by the numerical value included in the reach information Dfb. On the other hand, when the reach information Dfb indicates a negative value, the vehicle CPU 25 controls the load actuator 24 (specifically, the reach drive unit 24b) so that the forks 22 shift rearward by the stroke amount represented by the numerical value included in the reach information Dfb.

The tilt information Dfc is numerical information which possibly indicates a positive (+) value or negative (−) value. When the tilt information Dfc indicates a positive value, the vehicle CPU 25 controls the load actuator 24 (specifically, the tilt drive unit 24c) so that the forks 22 tilt frontward by the inclination angle represented by the numerical value included in the tilt information Dfc. On the other hand, when the tilt information Dfc indicates a negative value, the vehicle CPU 25 controls the load actuator 24 (specifically, the tilt drive unit 24c) so that the forks 22 tilt rearward by the inclination angle represented by the numerical value included in the tilt information Dfc.

Accordingly, the vehicle CPU 25 controls the travel actuator 23 when the vehicle communication unit 28 receives the remote operation signal SG1 which indicates a numerical value other than "O" at least as the travel speed information Dv. On the other hand, the vehicle CPU 25 controls the load actuator 24 when the vehicle communication unit 28 receives the remote operation signal SG1 which indicates a numerical value other than "0" as at least one item in the load-handling operation information D2.

As described above, a remote operation of the forklift truck 20 is performed based on the remote operation signal SG1 transmitted from the remote communication unit 36 when the remote operation device 30 and the forklift truck 20 (specifically, both the communication units 28 and 36) are disposed within a communicable range.

The following will describe a configuration associated with remote operation control of the forklift truck 20 using the remote operation device 30.

As shown in FIG. 2, the remote memory 34 stores a remote operation program 40 for executing various processes associated with remote operations of the forklift truck 20 and including a transmission process of the remote operation signal SG1. The remote operation program 40 is an application program for performing a remote operation of the forklift truck 20. The remote operation program 40 includes a remote operation control processing execution program 41 for executing a remote operation control process which controls remote operations. The remote operation program 40 corresponds to an "industrial vehicle remote operation program".

When a remote operation activation condition is met, the remote CPU 33 activates the remote operation program 40 (remote operation application).

According to the present embodiment, the remote operation activation condition is that an activation operation is performed for the remote operation device 30. For example, the activation operation is an input operation (tap operation) on any of remote operation icons in a configuration which displays the remote operation icons on the touch panel 31.

However, the remote operation activation condition is not limited to this condition but may be any conditions. For example, the remote operation activation condition may be a condition that communication connection between the remote communication unit 36 of the remote operation device 30 and the vehicle communication unit 28 of the forklift truck 20 is established, or that an activation operation is performed under a situation where communication connection between both the communication units 28 and 36 is established. Accordingly, an operation by the operator is not necessarily required for the remote operation activation condition.

With the activation of the remote operation program 40, the remote CPU 33 initially searches for the forklift truck 20 capable of establishing communication connection within a range communicable with the remote communication unit 36, and establishes communication connection with the vehicle communication unit 28 of the corresponding forklift truck 20 when the forklift truck 20 is found.

Thereafter, the remote CPU 33 displays an operation image G10 on the touch panel 31. The operation image G10 is stored in the remote operation program 40. Basically, the remote CPU 33 constantly displays the operation image G10 while the remote operation program 40 is activated.

Subsequently, the remote CPU 33 reads out the remote operation control processing execution program 41, and periodically executes the remote operation control process while the remote operation program 40 is activated to perform transmission control of the remote operation signal SG1 in accordance with the operation performed by the operator for the remote operation device 30. In this manner, the remote operation of the forklift truck 20 using the remote operation device 30 is controlled. The remote CPU 33 which executes the remote operation control process corresponds to a "remote operation control unit".

As shown in FIG. 4, an operation mode, a forced stop mode, and an in-stop mode are set herein as control modes of the remote operation in the remote operation control process. Accordingly, the remote operation device 30 (specifically, the remote CPU 33) has the operation mode, the forced stop mode, and the in-stop mode as the remote operation control mode.

Each of the modes will be briefly touched upon before the remote operation control process is detailed.

The operation mode is a control mode for remotely operating the forklift truck 20 in accordance with an operation performed for the remote operation device 30. During the operation mode, the forklift truck 20 is controlled in such a manner as to perform a motion corresponding to an operation performed for the remote operation device 30.

The operation mode has a plurality of modes. Specifically, the operation mode includes a travel mode for operating the travel actuator 23 as an operation target (control target), and a lift mode, a reach mode, and a tilt mode for operating the load actuator 24 as an operation target (control target).

The travel mode is an operation mode for performing a remote operation associated with traveling of the forklift truck 20. The lift mode is an operation mode for performing a remote operation associated with the lifting motion of the forks 22. The reach mode is an operation mode for performing a remote operation associated with the reaching motion of the forks 22. The tilt mode is an operation mode for performing a remote operation associated with the tilting motion of the forks 22. According to the present embodiment, therefore, an operation mode is set for each of different types of motions. In the following description, the lift mode, the reach mode, and the tilt mode are also collectively referred to as a load-handling mode.

The forced stop mode is a control mode for forcibly stopping the forklift truck 20. Accordingly, the remote operation device 30 of the present embodiment has a function of forcibly stopping the forklift truck 20. During the forced stop mode, the remote operation by the remote operation device 30 is stopped.

According to the present embodiment, the forced stop mode is a control mode for forcibly stopping a corresponding motion when any one of various motions is performed by the forklift truck 20. The various motions are any types of motions. For example, the various motions include at least either traveling or a motion of the forks 22.

The in-stop mode is a control mode set in a period from a forced stop of the forklift truck 20 to a restart of the remote operation, for example. During the in-stop mode, the remote operation by the remote operation device 30 is stopped.

The state where the remote operation by the remote operation device 30 is stopped refers to a state where the forklift truck 20 does not perform a motion corresponding to any one of the various operations performed for the remote operation device 30 even when the corresponding operation is performed. In other words, each of the forced stop mode and the in-stop mode is also considered as a control mode which restricts the remote operation of the forklift truck 20 so that the motion corresponding to the operation performed for the remote operation device 30 is not performed.

In the remote operation control process, the remote CPU 33 shifts to any one of the operation mode, the forced stop mode, and the in-stop mode, based on whether or not any one of the various operations has been performed for the remote operation device 30, for example, more specifically, based on whether or not an input operation has been made to the touch panel 31 on which the operation image G10 is displayed, for example. In this manner, the remote operation of the forklift truck 20 using the remote operation device 30 is performed, or is stopped. The operation mode is also considered as a control mode permitting (allowing) the remote operation, while each of the forced stop mode and the in-stop mode is also considered as a control mode prohibiting the remote operation.

As already described, the control mode includes modes in which the remote operation is stopped. The control mode set while the remote operation program 40 is activated (i.e., initial control mode) is the in-stop mode. Accordingly, the remote operation of the forklift truck 20 using the remote operation device 30 is not immediately started in response to activation of the remote operation program 40.

More specifically, activation and stop of the remote operation program 40 are not completely synchronized with actual start and stop of the remote operation of the forklift truck 20. The start and stop of the remote operation may be repeated in accordance with an operation by the operator while the remote operation program 40 is activated.

According to the present embodiment, a dedicated mode is set for each of motion types in the operation mode. The remote CPU 33 performs the remote operation of the forklift truck 20 in a mode selected in advance from the travel mode, the lift mode, the reach mode, and the tilt mode in the operation mode. In this manner, simultaneous execution of two or more motions is avoided.

The operation image G10 displayed on the touch panel 31 in response to activation of the remote operation program 40 will be next described with reference to FIGS. 5 and 6.

Figure 5:
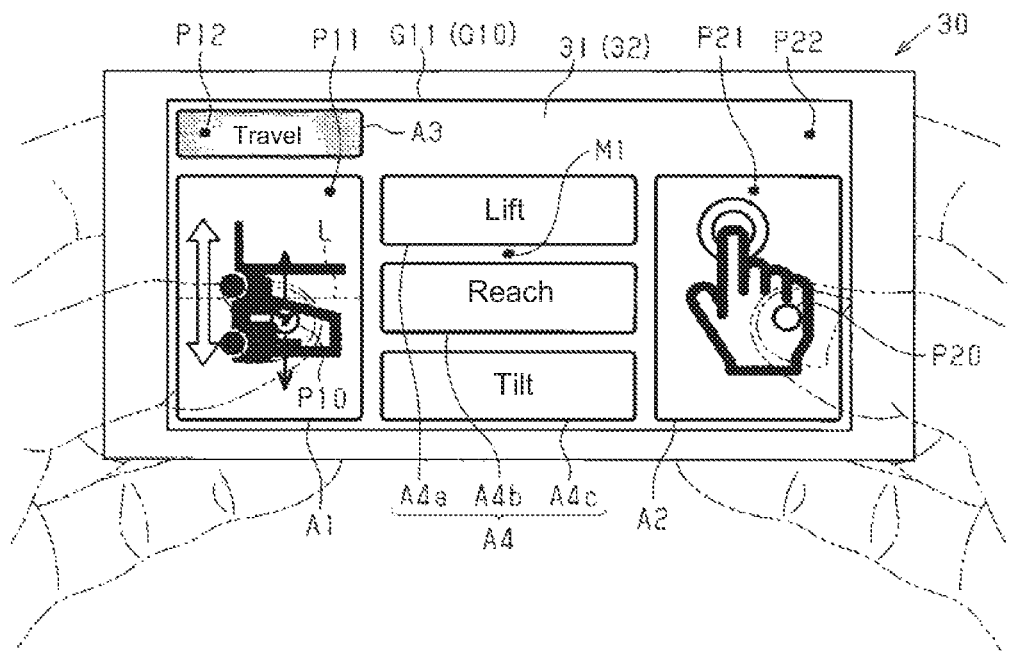
FIG. 5 is a front view of a remote operation device on which a travel mode image is displayed.
Figure 6:
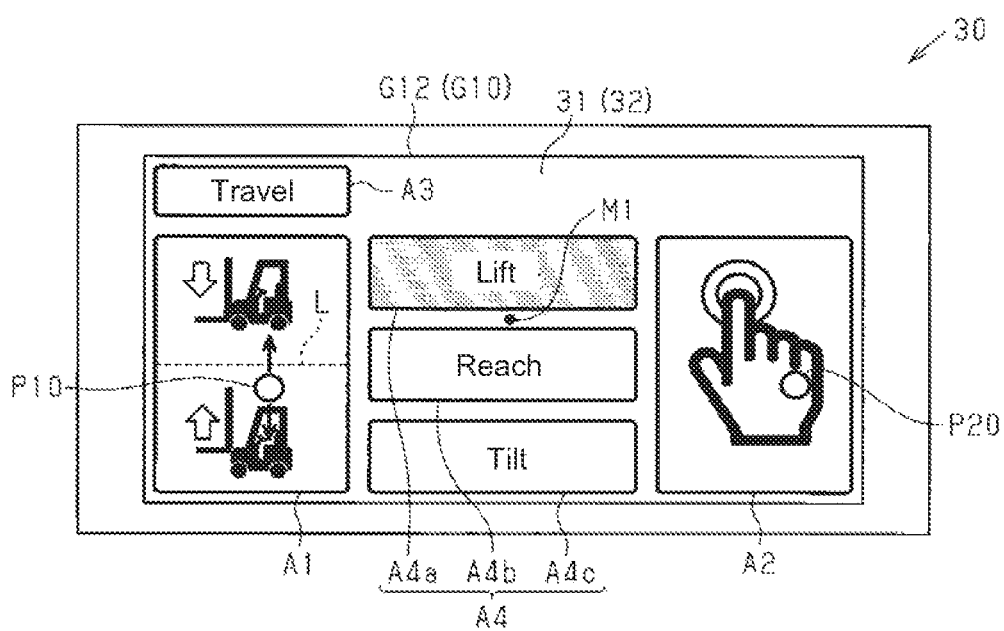
FIG. 6 is a front view of the remote operation device on which a lift mode image is displayed.

As shown in FIGS. 5 and 6, the operation image G10 is displayed on an entire surface of the touch panel 31. The operation image G10 has a shape having a longer direction and a shorter direction (specifically, a rectangular shape) in correspondence with the touch panel 31 which has a shape having a longer direction and a shorter direction (specifically, a rectangular shape).

The operation image G10 has a plurality of sectioned areas A1 to A4. Specifically, the operation image G10 includes a first area A1 as a specified area, a second area A2 provided at a position different from the first area A1, a traveling mode setting area (traveling mode icon) A3, and a load-handling mode setting area (load-handling mode icon) A4 as a motion mode setting area. The respective areas A1 to A4 are disposed apart from each other. It is assumed that each of the areas A1 to A4 is an area to which an input operation is made by the operator. Considering this point, each of the areas A1 to A4 is also considered as an operation icon.

The first area A1 is disposed near a first end of both ends of the operation image G10 in the longer direction. The first area A1 is provided at a position where a left hand finger (e.g., thumb) is automatically located when the remote operation device 30 is held with both hands. An image associated with a motion of the forklift truck 20, and a centerline L are displayed inside the first area A1.

The second area A2 is disposed near a second end opposite to the first end in both the ends of the operation image G10 in the longer direction. The first area A1 and the second area A2 are so disposed opposite to each other and located apart from each other in the longer direction of the touch panel 31 (i.e., the operation image G10). The second area A2 is provided at a position where a right hand finger (e.g., thumb) is automatically located when the remote operation device 30 is held with both hands. An image prompting a finger touch is displayed within the second area A2.

When the remote operation device 30 thus configured is held with both hands, it is expected that the left thumb is automatically placed inside the first area A1, and that the right thumb is placed inside the second area A2. Accordingly, the operator may simultaneously and easily perform an input operation to the inside of the first area A1 and an input operation to the inside of the second area A2.

The traveling mode setting area A3 is provided at a position apart from the first area A1 in the shorter direction of the remote operation device 30 inside the operation image G10. Accordingly, the traveling mode setting area A3 and the first area A1 are disposed in the shorter direction. An image indicating the travel mode, i.e., characters of "Travel" in the present embodiment, is displayed inside the traveling mode setting area A3.

The load-handling mode setting area A4 is arranged between the first area A1 and the second area A2. The load-handling mode setting area A4 includes a lift mode setting area A4a used for setting the lift mode, a reach mode setting area A4b used for setting the reach mode, and a tilt mode setting area A4c used for setting the tilt mode. The lift mode setting area A4a, the reach mode setting area A4b, and the tilt mode setting area A4c are arranged in the shorter direction. The lift mode setting area A4a, the reach mode setting area A4b, and the tilt mode setting area A4c are also considered as a lift mode icon, a reach mode icon, and a tilt mode icon, respectively.

An image indicating the lift mode, i.e., characters of "Lift" in the present embodiment, is displayed inside the lift mode setting area A4a. An image indicating the reach mode, i.e., characters of "Reach" in the present embodiment, is displayed inside the reach mode setting area A4b. An image indicating the tilt mode, i.e., characters of "Tilt" in the present embodiment, is displayed inside the tilt mode setting area A4c.

The image displayed in each of the mode setting areas A3 and A4a to A4c may be any image as long as the corresponding mode is recognizable from the image. For example, an image schematically showing a motion associated with the corresponding mode may be displayed instead of characters.

According to the present embodiment, each of the first area A1 and the second area A2 is larger than each of the mode setting areas A3 and A4a to A4c. Accordingly, touching the first area A1 and the second area A2 is easier than touching each of the other mode setting areas A3 and A4a to A4c. The traveling mode setting area A3 is smaller than each of the mode setting areas A4a to A4c.

The touch sensor 32 detects an input operation to any one of the areas A1 to A4, and outputs a result of the detection to the remote CPU 33. In this manner, the remote CPU 33 determines the input operation to each of the areas A1 to A4.

According to the present embodiment, a plurality of operation images are set as the operation image G10 herein in correspondence with a plurality of the operation modes set herein. Specifically, the operation image G10 includes a travel mode image G11 corresponding to the travel mode, a lift mode image G12 corresponding to the lift mode, a reach mode image corresponding to the reach mode, and a tilt mode image corresponding to the tilt mode. The remote CPU 33 is configured to display the operation image G10 corresponding to the operation mode.

The travel mode image G11 and the lift mode image G12 have the same basic layout, but have different images displayed in the first area A1 and different highlighted areas.

Specifically, an image of the forklift truck 20 and an image of arrows extending in the shorter direction and suggesting a traveling direction of the forklift truck 20 are displayed in the first area A1 of the travel mode image G11, as shown in FIG. 5. From these images, the operator may intuitively understand forward movement of the forklift truck 20 in accordance with a swipe operation toward the side suggesting forward movement (specifically, the traveling mode setting area A3 side) using a finger or the like, and backward movement of the forklift truck 20 in accordance with a swipe operation toward the opposite side (specifically, the side suggesting the backward movement). In the travel mode image G11, the traveling mode setting area A3 is highlighted.

The swipe operation is constituted by a series of input motions in which position of an input operation is moved while maintaining the state that the input operation (i.e., tap operation) is made to the touch panel 31. In other words, the swipe operation is an input operation made to the touch panel 31, where the position of the input operation successively changes.

An image suggesting the lifting motion of the forks 22 is displayed in the first area A1 of the lift mode image G12, as shown in FIG. 6. Specifically, an image of the forklift truck 20 showing a lowering motion, and an image of the forklift truck 20 showing a raising motion are displayed side by side in the shorter direction. In the lift mode image G12, the lift mode setting area A4a is highlighted.

Accordingly, an image associated with traveling of the forklift truck 20 is displayed in the first area A1 of the travel mode image G11, while an image associated with a motion of the forks 22 (specifically, lifting motion) is displayed in the first area A1 of the lift mode image G12.

Each of the reach mode image and the tilt mode image is similar to the lift mode image G12, except that the image in the first area A1 and the highlighted portion are different. Accordingly, illustration and detailed description of the reach mode image and the tilt mode image are omitted herein.

The remote CPU 33 determines an input operation to the operation image G10 in the remote operation control process, and controls the remote operation based on a result of the determination, more specifically, a shift to any of the modes, transmission of the remote operation signal SG1, and others. The remote operation control process will be hereinafter described with reference to FIGS. 7 to 11.

Figure 7:
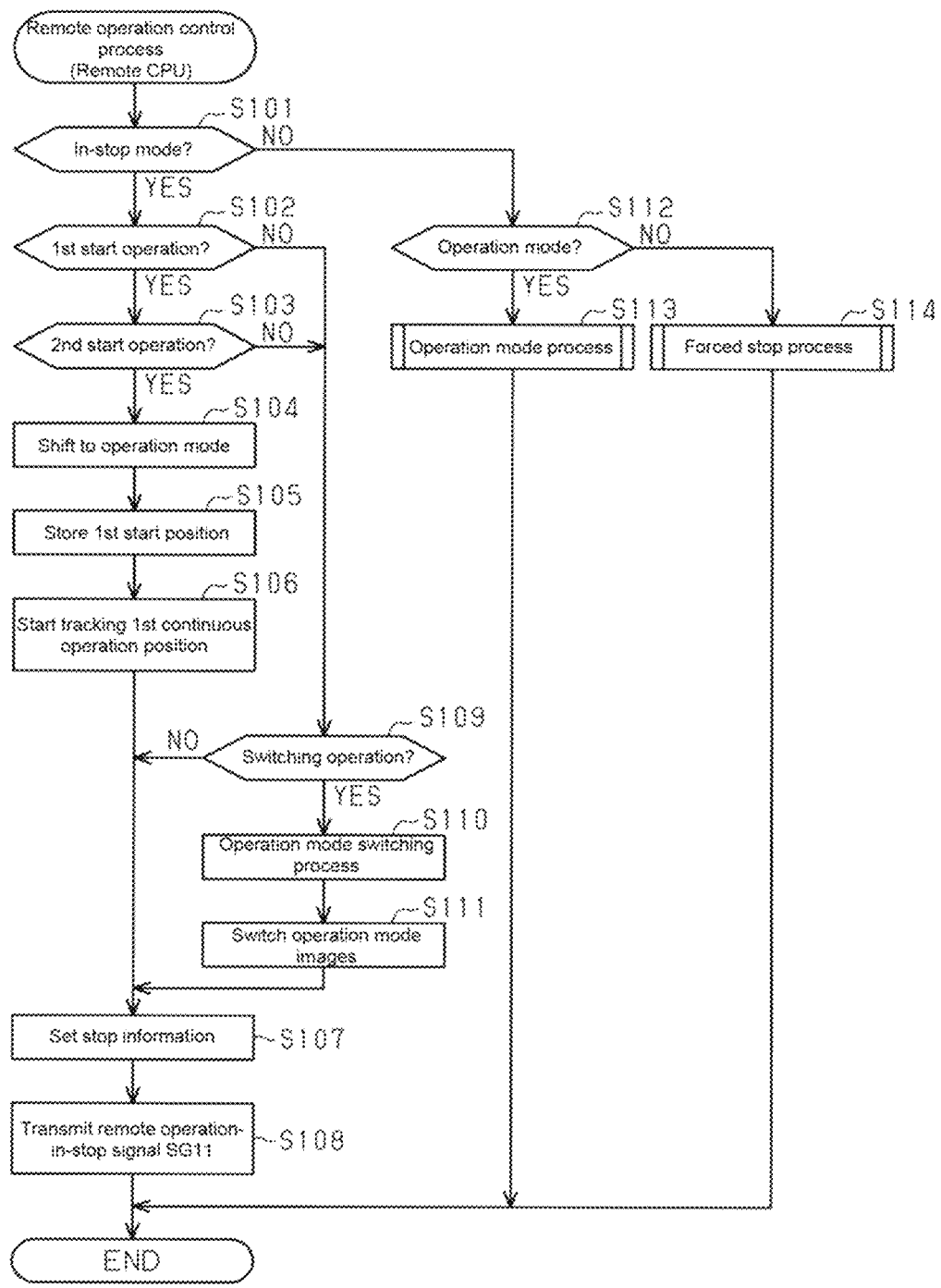
FIG. 7 is a flowchart showing a remote operation control process according to the first embodiment.

As shown in FIG. 7, the remote CPU 33 first determines whether or not the current control mode is the in-stop mode in step S101.

Specifically, the remote operation program 40 includes a control mode storage unit 42 which stores a setting of control mode specifying information for specifying the current control mode of the remote operation device 30 (remote CPU 33) (see FIG. 2). In step S101, the remote CPU 33 determines the current control mode with reference to the control mode specifying information stored in the control mode storage unit 42, and determines whether or not the current control mode is the in-stop mode. According to the present embodiment, as already described, the control mode at the time of activation of the remote operation program 40 is the in-stop mode.

When it is determined that the current control mode is the in-stop mode, the remote CPU 33 determines in steps S102 to S111 whether to shift from the in-stop mode to the operation mode, and switches the operation mode based on a switching operation as shown in FIG. 7.

Initially, the remote CPU 33 determines whether or not a remote operation start condition is met in step S102 and step S103. Specifically, the remote CPU 33 determines whether or not a first start operation is performed in step S102. According to the present embodiment, the first start operation is an input operation to the inside of the first area A1. The remote CPU 33 determines whether or not the input operation to the inside of the first area A1 is made, based on a detection result obtained by the touch sensor 32.

When the remote CPU 33 determines that the first start operation is not made, the process proceeds to step S109. When the remote CPU 33 determines that the first start operation is made, the process proceeds to step S103.

In step S103, the remote CPU 33 determines whether or not a second start operation different from the first start operation is made. According to the present embodiment, therefore, the remote operation start condition is execution of both the first start operation and the second start operation. In addition, according to the present embodiment, the execution of both the first start operation and the second start operation corresponds to a "start operation".

According to the present embodiment, the second start operation is an input operation to the inside of the second area A2. The remote CPU 33 determines whether or not the input operation to the inside of the second area A2 is made, based on a detection result obtained by the touch sensor 32.

To explain further, the first start operation and the second start operation are similar in that both the input operations are input operations to the touch panel 31, but are different in that the positions of the respective input operations are different. Accordingly, both the start operations are operations different from each other.

When the remote CPU 33 determines that the second start operation is not made, the process proceeds to step S109. When the remote CPU 33 determines that the second start operation is made, the process proceeds to step S104.

In step S104, the remote CPU 33 shifts the control mode from the in-stop mode to the operation mode. Specifically, the remote CPU 33 updates the control mode specifying information to information corresponding to the operation mode.

Accordingly, the remote CPU 33 shifts the control mode from the in-stop mode to the operation mode based on determination that both the start operations of the first start operation and the second start operation are performed. As a result, the remote operation of the forklift truck 20 using the remote operation device 30 is started. In other words, the remote operation start condition of the present embodiment is execution of both the start operations. In the following description, the first start operation and the second start operation are also referred to as both the start operations.

According to the present embodiment, the operation mode is herein constituted by four operation modes, namely, the travel mode, the lift mode, the reach mode, and the tilt mode. In step S104, the remote CPU 33 shifts to any one of the four operation modes.

Specifically, the remote operation program 40 includes an operation mode storage unit 43 which stores operation mode specifying information for specifying the operation mode (see FIG. 2). With the shift of the control mode to the operation mode, the remote CPU 33 specifies the operation mode currently set based on the operation mode specifying information, and shifts to the corresponding operation mode. When the travel mode is set as the operation mode, for example, the remote CPU 33 shifts from the in-stop mode to the travel mode in step S104.

In subsequent step S105, the remote CPU 33 stores, in the remote memory 34, a first start position P10 which is the position where the first start operation is made at the start of the remote operation. Specifically, the remote CPU 33 stores, in a start position storage unit 44 (see FIG. 2) included in the remote operation program 40, the position of the input operation made to the inside of the first area A1 and detected in the current remote operation control process. A position is also considered as coordinates, wherefore the first start position P10 is also considered as first start coordinates.

The first start position P10 herein is the position of the first start operation when both the start operations are made, in other words, when the remote operation start condition is met. Accordingly, if the second start operation is made after execution of the first start operation, the first start position P10 is the position of the first start operation when the second start operation is made. On the other hand, if the first start operation is made after execution of the second start operation, the first start position P10 is the position where the input operation is initially made to the inside of the first area A1, i.e., an initial position of the first start operation.

Thereafter, the remote CPU 33 starts tracking of a first continuous operation position which is a position where a first continuous operation is performed in step S106. Specifically, the remote CPU 33 stores, in a tracking storage unit 45 included in the remote operation program 40, the first start position P10 as an initial position (initial coordinates) of the first continuous operation position. When the first continuous operation position continuously changes from the initial position (the first start position P10) in accordance with a finger swipe operation or the like on the operation image G10, the remote CPU 33 tracks the first continuous operation position and recognizes that the first continuous operation is being performed.

Specific processing details associated with tracking of the first continuous operation position may be any processing details. According to the present embodiment, the tracking is performed using the tracking storage unit 45. This will be touched upon in step S201 described below. The first continuous operation position is considered as a current position of the first continuous operation, or a position where a tap operation is currently made.

In subsequent step S107, the remote CPU 33 sets stop information as the remote operation signal SG1 regardless of the operation performed for the remote operation device 30. The stop information is information for maintaining a stopped state of the remote operation of the forklift truck 20, more specifically, information which indicates "0" as all items of the traveling operation information D1 and the load-handling operation information D2. The processing of step S107 is also considered as processing for generating the remote operation signal SG1 which includes the setting of the stop information. In the following description, the remote operation signal SG1 which includes the setting of the stop information is simply referred to as a remote operation-in-stop signal SG11.

Thereafter, the remote CPU 33 transmits the remote operation-in-stop signal SG11 using the remote communication unit 36 in step S108. The forklift truck 20 stops both traveling of the forklift truck 20 and driving of the forks 22 when the vehicle communication unit 28 receives the remote operation-in-stop signal SG11. Accordingly, the remote operation of the forklift truck 20 is stopped in a situation where the remote operation-in-stop signal SG11 is transmitted.

Actually, the remote operation of the forklift truck 20 is stopped in the in-stop mode, wherefore the forklift truck 20 having received the remote operation-in-stop signal SG11 is considered to be maintaining the stopped state of the remote operation.

On the other hand, when at least either the first start operation or the second start operation is not made, the remote CPU 33 determines whether or not an operation mode switching condition which is a switching condition of the operation mode is met in step S109.

According to the present embodiment, the operation mode switching condition is that a switching operation is performed for the remote operation device 30. For example, the switching operation is an input operation to any one of the respective mode setting areas A3 and A4a to A4c. The remote CPU 33 determines whether or not an input operation has been made to any one of the mode setting areas A3 and A4a to A4c based on a detection result obtained by the touch sensor 32.

When the remote CPU 33 determines that no input operation is made to any one of the mode setting areas A3 and A4a to A4c, the process proceeds to step S107. On the other hand, when the remote CPU 33 determines that an input operation has been made to any one of the mode setting areas A3 and A4a to A4c, the remote CPU 33 executes an operation mode switching process for switching the operation mode in step S110 on an assumption that the operation mode switching condition has been met.

In step S110, the remote CPU 33 switches the mode to an operation mode corresponding to the switching operation. Specifically, the remote CPU 33 specifies the mode setting area to which the input operation has been made, based on a detection result obtained by the touch sensor 32, and sets the operation mode to the mode corresponding to the specified mode setting area.

For example, when an input operation to the lift mode setting area A4a is detected in a situation where the operation mode is the travel mode, the remote CPU 33 switches the operation mode from the travel mode to the lift mode. Similarly, when an input operation to the tilt mode setting area A4c is detected in a situation where the operation mode is the reach mode, the remote CPU 33 switches the operation mode from the reach mode to the tilt mode. Accordingly, switching of the operation mode of the present embodiment includes switching between the travel mode and the load-handling mode, and switching between the load-handling modes.

As already described, the remote CPU 33 is configured to specify the operation mode based on the operation mode specifying information stored in the operation mode storage unit 43. Accordingly, the remote CPU 33 updates the operation mode specifying information to information corresponding to the switching operation in step S110. In this manner, the remote CPU 33 may determine switching of the operation mode.

This point is further explained in case further explanation is needed. Switching of the operation mode and switching of the control mode are different processes. Accordingly, the control mode remains in the in-stop mode even when the operation mode switching process is made.

In subsequent step S111, the remote CPU 33 displays the operation image G10 corresponding to the operation mode switched in step S110, and the process proceeds to step S107. When the operation mode is switched from the travel mode to the lift mode in step S110, for example, the remote CPU 33 displays the lift mode image G12 instead of the travel mode image G11 as the operation image G10. Accordingly, the remote CPU 33 switches the operation image G10 in accordance with the operation mode in step S111.

According to the configuration described above, the control mode shifts from the in-stop mode to the operation mode to start the remote operation of the forklift truck 20 when both the first start operation and the second start operation are performed for the remote operation device 30 in the in-stop mode. However, when at least either the first start operation or the second start operation is not performed for the remote operation device 30, the remote operation is not started.

In addition, the operation mode is switched when the switching operation is performed in a state that at least either the first start operation or the second start operation is not made in the in-stop mode. In this manner, the operation mode at the time of the start of the remote operation may become a desired mode by performing the switching operation during the in-stop mode.

The operation mode switching process is executed during the in-stop mode where the remote operation is stopped. Accordingly, the operation mode is switched only while the remote operation is stopped. In this case, the operation mode which is the in-stop mode is also considered as a part of the operation mode switching condition. In other words, the operation mode switching condition is considered as a condition that the switching operation is made in a situation where the operation mode is the in-stop mode.

In particular, when both the start operations and the switching operation are executed, the shift of the control mode from the in-stop mode to the operation mode is performed with priority over switching of the operation modes. In this case, switching of the operation modes is not performed.

As shown in FIG. 7, the remote CPU 33 makes a negative determination in step S101 when the current control mode is not the in-stop mode. In this case, the remote CPU 33 advances the process to step S112, and determines whether or not the current control mode is the operation mode.

When the current control mode is the operation mode, the process proceeds to step S113. In this case, the remote CPU 33 executes a process of an operation mode corresponding to the operation mode, and ends this remote operation control process.

For example, when the control mode shifts from the in-stop mode to the operation mode in a given remote operation control process, an operation mode process is executed in a remote operation control process executed subsequently to the process of the given remote operation control.

Figure 8:
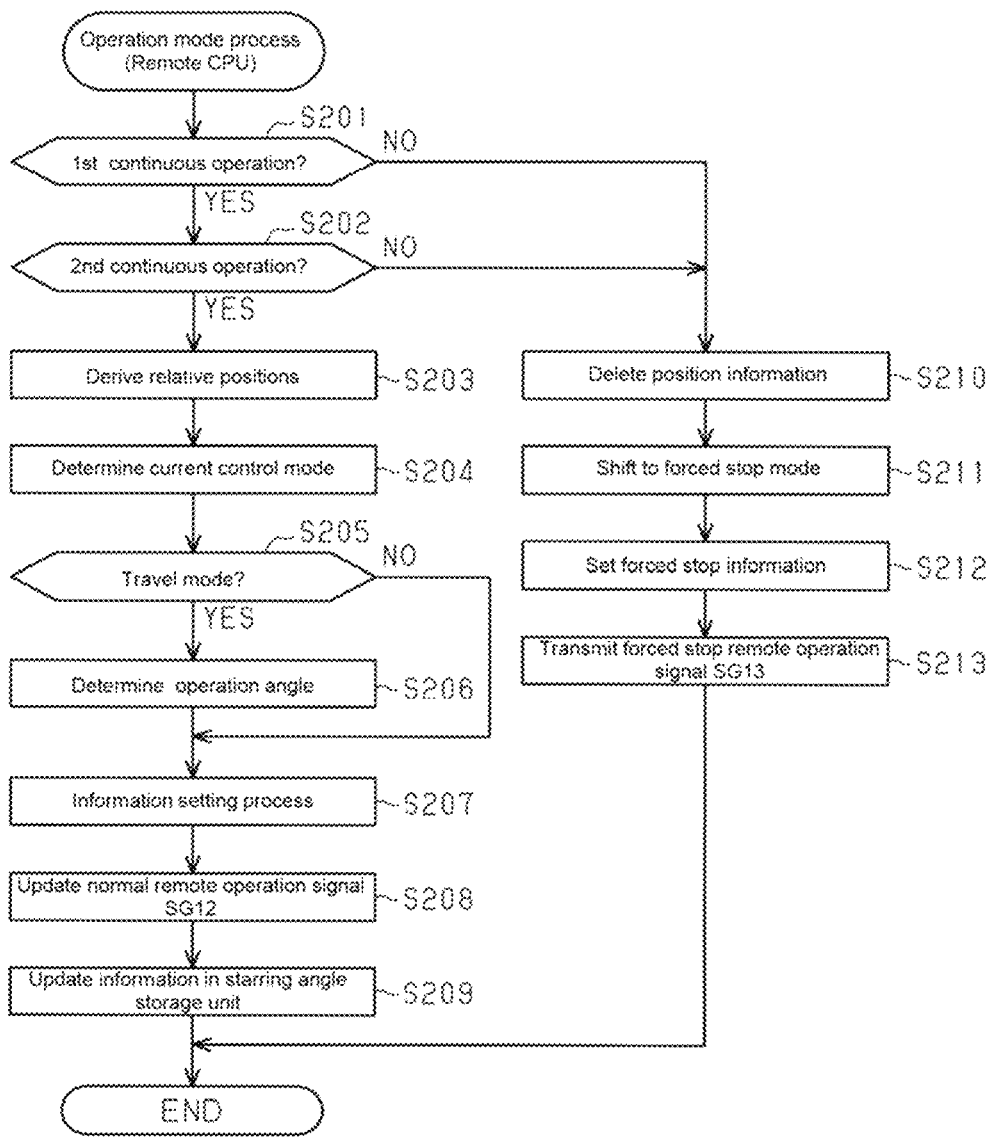
FIG. 8 is a flowchart showing a process of an operation mode according to the first embodiment.

The following will describe the processing of the operation mode with reference to FIG. 8.

As shown in FIG. 8, the remote CPU 33 initially determines whether or not the first continuous operation has been made in step S201. According to the present embodiment, the remote CPU 33 determines whether or not the first continuous operation has been performed based on a detection result obtained by the touch sensor 32 and a position stored in the tracking storage unit 45.

Specifically, the remote CPU 33 initially determines whether or not an input operation has been made to the touch panel 31 using the touch sensor 32.

When an input operation to the touch panel 31 is detected, the remote CPU 33 determines whether or not the position of the input operation currently detected is continuous with the position stored in the tracking storage unit 45. For example, the remote CPU 33 compares the position of the input operation currently detected with the position stored in the tracking storage unit 45, and determines that both the positions are continuous when the respective positions are located within a specified range. When both the positions are located outside the specified range, the remote CPU 33 determines that the respective positions are not continuous. In other words, the remote CPU 33 determines whether the finger is in contact with the touch panel 31, and determines whether or not the contact positions are continuous based on the finger contact position that is currently detected and the contact position that is previously detected.

When input operations at a plurality of positions of the touch panel 31 are detected, the remote CPU 33 designates, as a determination target, the position of the input operation included in the plurality of positions and located closest to the position stored in the tracking storage unit 45, and determines whether or not the position of the determination target is continuous with the position stored in the tracking storage unit 45.

When the remote CPU 33 determines that the position of the input operation currently detected is continuous with the position stored in the tracking storage unit 45, the remote CPU 33 updates the position stored in the tracking storage unit 45 to set the position of the input operation currently detected in the tracking storage unit 45. Thereafter, the process proceeds to step S202. In this manner, the position stored in the tracking storage unit 45 is updated in accordance with movement of the finger. The tracking storage unit 45 therefore stores the latest first continuous operation position. The first continuous operation position is also considered as the current position (coordinates) associated with the input operation to the touch panel 31 as a trigger (basis) of the determination that the first continuous operation is being made.

On the other hand, the remote CPU 33 determines that the first continuous operation is not made in either a case where the input operation to the touch panel 31 is not detected, or a case where the input operation to the touch panel 31 is detected without establishment of continuation between the position of the input operation currently detected and the position stored in the tracking storage unit 45. In this situation, the remote CPU 33 makes a negative determination in step S201, and advances the process to step S210.

Accordingly, the remote CPU 33 determines that the first continuous operation is performed based on the input operation made to a position relatively close to the position stored in the tracking storage unit 45.

When attention is paid to the fact that the remote operation control process is periodically executed, the remote CPU 33 of the present embodiment is considered to determine that the first continuous operation is not performed in a state that an input operation is not made to the touch panel 31 in a period longer than a period of execution of the remote operation control process. Similarly, the remote CPU 33 determines that the first continuous operation is not performed when the position of the input operation currently detected is away from the position of the input operation detected in the previous remote operation control process, even in a state where the input operation is made to the touch panel 31.

Accordingly, the first continuous operation of the present embodiment is an operation which meets three conditions of: (A) a condition that an input operation has been made to the touch panel 31; (B) a condition that a position of an input operation that is currently detected and the first continuous operation position that is previously detected are located within a specified range; and (C) a condition that a period from detection timing of the previous first continuous operation to detection timing of the current input operation is a specified period or shorter. In other words, the first continuous operation of the present embodiment is an operation that is continuously performed from the first start operation at the start of the remote operation, and performed such that the input operation position is continuous from the position of the first start operation at the start of the remote operation.

The conditions of the first continuous operation do not include a condition that the position of the input operation currently detected is located inside the first area A1. Accordingly, as shown in FIG. 5, for example, the first continuous operation includes a case where the finger swipes from the first start position P10 to a first predetermined position P11 within the first area A1, and also a case where the finger swipes from the first start position P10 to a second predetermined position P12 outside the first area A1.

Moreover, although the specified period of the present embodiment is an execution period of the remote operation control process, the specified period is not limited to this period and may be a longer period than the execution period of the present embodiment. For example, in a configuration which periodically executes the remote operation control process, the remote CPU 33 may determine that the first continuous operation is not made when an input operation to the touch panel 31 is not successively detected twice. In this case, the specified period is twice the execution period of the remote operation control process.

As shown in FIG. 8, the remote CPU 33 determines whether or not the second continuous operation has been made in step S202. Specifically, the remote CPU 33 determines whether or not the input operation has been made to the inside of the second area A2 based on a detection result obtained by the touch sensor 32. When no input operation to the inside of the second area A2 is detected, the remote CPU 33 determines that the second continuous operation is not made. In this case, the process proceeds to step S210. On the other hand, when an input operation to the inside of the second area A2 is detected, the remote CPU 33 makes an affirmative determination on an assumption that the second continuous operation is made in step S202.

The second continuous operation of the present embodiment is therefore Si an input operation made to the inside of the second area A2 and continuously made from the second start operation at the start of the remote operation. Accordingly, as shown in FIG. 5, for example, the remote CPU 33 determines that the second continuous operation is made when the position of the second continuous operation is shifted by a finger swipe operation from a second start position P20 where the second start operation is made to a predetermined position P21 within the second area A2. On the other hand, the remote CPU 33 determines that the second continuous operation is not made when the position of the second continuous operation is shifted by a finger swipe operation from the second start position P20 to a predetermined position P22 outside the second area A2.

When attention is paid to the fact that the remote operation control process is periodically executed, the remote CPU 33 of the present embodiment determines that the second continuous operation is not made in a state that an input operation is not made to the inside of the second area A2 in a period longer than a period of execution of the remote operation control process.

In other words, the second continuous operation of the present embodiment is an operation which meets two conditions of: (D) a condition that an input operation is not made to the inside of the second area A2; and (E) a condition that a period from detection timing of a previous input operation to the inside of the second area A2 to timing of detection of a current input operation to the inside of the second area A2 is a specified period or shorter.

The second continuous operation of the present embodiment may be any input operations input to the inside of the second area A2 and continuously performed from the second start operation at the start of the remote operation. Continuity of the input operation positions is not required.

Moreover, although the specified period of the present embodiment is an execution period of the remote operation control process, the specified period is not limited to this period and may be a longer period than the execution period of the present embodiment. For example, in a configuration which periodically executes the remote operation control process, the remote CPU 33 may determine that the second continuous operation is not made when the input operation to the inside of the second area A2 is not successively detected twice. In this case, the specified period is twice the execution period of the remote operation control process.

As shown in FIG. 8, when it is determined that both the first continuous operation and the second continuous operation are made (step S201: YES and step S202: YES), the remote CPU 33 executes a process for transmitting the remote operation signal SG1 corresponding to the manner of operation and the operation mode of the operation performed for the remote operation device 30 in steps S203 to S208. In the following description, the remote operation signal SG1 corresponding to the manner of operation and the operation mode of the operation performed for the remote operation device 30 is referred to as a normal remote operation signal SG12. In addition, the first continuous operation and the second continuous operation are also referred to as both the continuous operations.

Specifically, in step S203, the remote CPU 33 derives relative positions of the first start position P10 and the first continuous operation position based on the start position storage unit 44 and the tracking storage unit 45. In other words, the remote CPU 33 is also considered to derive relative positions of the initial position where the input operation is first made and the position where the current input operation is made in a series of input operations continuously made from the start operation at the start of the remote operation.

In subsequent step S204, the remote CPU 33 determines the current operation mode based on the operation mode specifying information. Thereafter, the remote CPU 33 determines whether or not the current operation mode is the travel mode in step S205. When the current operation mode is not the travel mode, the remote CPU 33 advances the process to step S207.

On the other hand, when the current operation mode is the travel mode, the remote CPU 33 in step S206 determines an operation angle of the first rotation operation, which is a manner of operation of the first rotation operation, and advances the process to step S207. Specifically, the remote CPU 33 stores a rotation position of the remote operation device 30 in the first rotation operation direction based on a detection result obtained by the position detection unit 35 at the start of remote operation (at the time of the shift of the control mode from the stop mode to the operation mode). Thereafter, the remote CPU 33 determines a current rotation position of the remote operation device 30 in the first rotation operation direction based on a detection result obtained by the position detection unit 35, and determines an operation angle which is a change amount from the rotation position at the start of the remote operation to the current rotation position in the first rotation operation direction.

Figure 9:
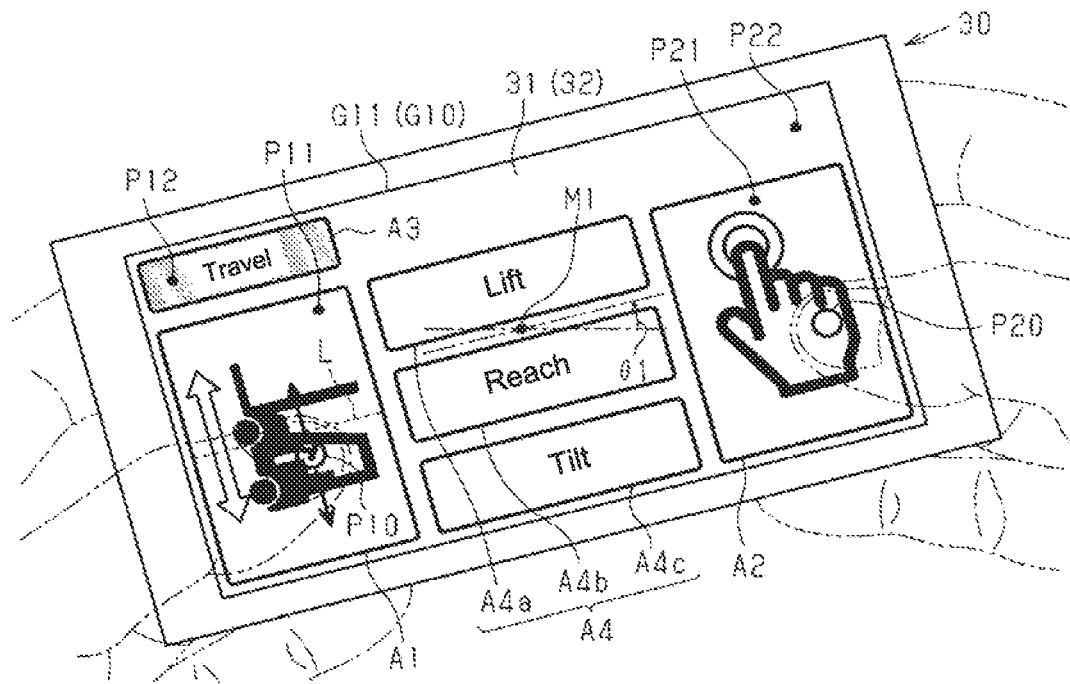
FIG. 9 is a front view of the remote operation device when a first rotation operation is performed.

For example, suppose that the remote operation is started in a position (rotational position) shown in FIG. 5. Thereafter, when the first rotation operation is performed counterclockwise by a first angle θ1 with respect to the start of the remote operation as viewed from the operator, the remote CPU 33 determines an operation angle which is a positive value having an absolute value of the first angle θ1 as shown in FIG. 9.

Figure 10:
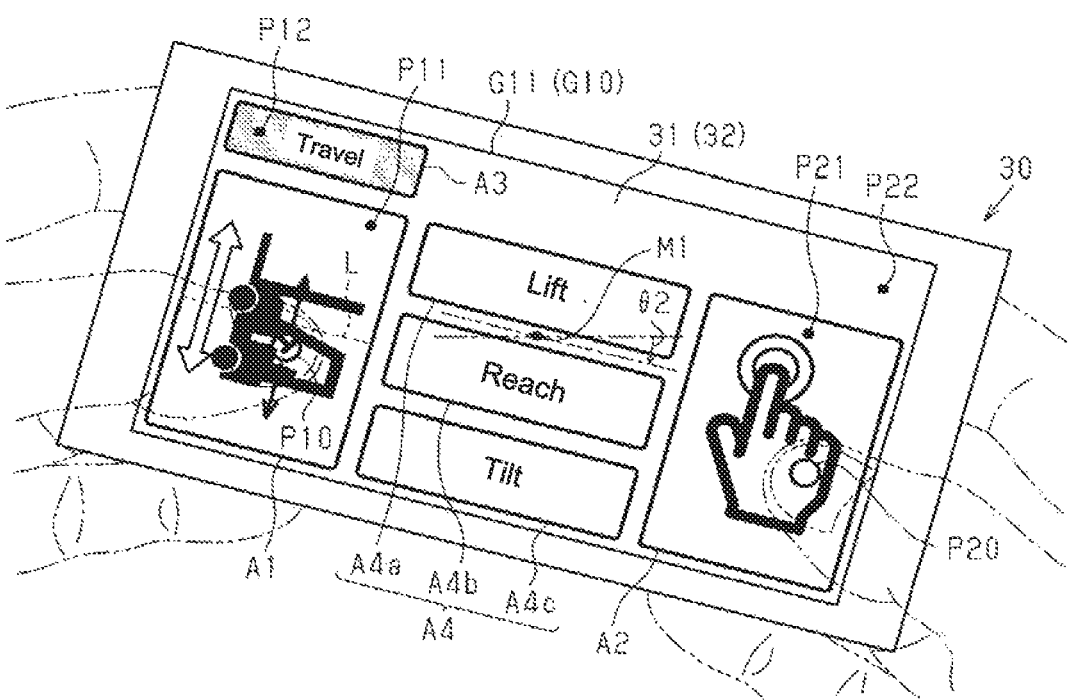
FIG. 10 is a front view of the remote operation device when the first rotation operation is performed.

On the other hand, when the first rotation operation is performed clockwise by a second angle θ2 with respect to the start of the remote operation as viewed from the operator, the remote CPU 33 determines an operation angle which is a negative value having an absolute value of the second angle θ2 as shown in FIG. 10. In this manner, the rotation direction may be specified based on the positive or negative value of the operation angle, and a rotation amount may be specified based on the absolute value of the operation angle.

As shown in FIG. 8, the remote CPU 33 sets information associated with at least the relative positions and the current operation mode as the remote operation signal SG1 in step S207. Specifically, the remote CPU 33 sets numerical values corresponding to the relative positions and the like as information associated with the operation mode.

The following will describe the processing of step S207 performed when the operation mode is the travel mode.

For example, when the first continuous operation position is deviated from the first start position P10 in the shorter direction of the touch panel 31, the remote CPU 33 sets numerical values other than "0" as the travel speed information Dv and the acceleration information Dα included in the traveling operation information D1, and sets "0" as the load-handling operation information D2.

According to the present embodiment, the remote CPU 33 sets a numerical value of the travel speed information Dv such that the travel speed of the forklift truck 20 increases as the distance between the first start position P10 and the first continuous operation position increases in the shorter direction of the touch panel 31. The remote CPU 30 sets a numerical value of acceleration information Dα in correspondence with the travel speed set as the travel speed information Dv.

For example, as shown in FIG. 5, the second predetermined position P12 is located farther away from the first start position P10 in the shorter direction of the touch panel 31 than the first predetermined position P11 is. In the configuration, the absolute value of the travel speed information Dv in a state where the first continuous operation position is the second predetermined position P12 is set larger than the absolute value of the travel speed information Dv in a state where the first continuous operation position is the first predetermined position P11.

When the first continuous operation position is located above the first start position P10, specifically, on one end side in the shorter direction of the touch panel 31 (traveling mode setting area A3 side) in a situation where the operation mode is the travel mode, the remote CPU 33 sets a value (e.g., positive numerical value) corresponding to forward movement as the travel speed information Dv. On the other hand, when the first continuous operation position is located below the first start position P10, specifically, on the other end side in the shorter direction of the touch panel 31, the remote CPU 33 sets a value corresponding to backward movement as the travel speed information Dv, such as a negative numerical value. Accordingly, the remote CPU 33 determines whether to move forward or backward based on the swipe direction from the first start position P10.

When the first continuous operation position is not deviated from the first start position P10 in the shorter direction of the touch panel 31, the remote CPU 33 sets "0" indicating numerical value information associated with a stop as both the travel speed information Dv and the acceleration information Dα.

When the operation mode is the travel mode, the remote CPU 33 further sets a numerical value corresponding to the operation angle as the steering angle information Dθ. For example, when the operation angle is a positive value, the remote CPU 33 sets a value corresponding to a left turn as the steering angle information Dθ. When the operation angle is a negative value, the remote CPU 33 sets a value corresponding to a right turn as the steering angle information Dθ. The remote CPU 33 sets a value corresponding to a larger steering angle as the steering angle information Dθ as the absolute value of the operation angle increases. When the first rotation operation is not detected, that is, when the operation angle is "0", the remote CPU 33 sets "0" corresponding to a neutral steering angle as the steering angle information Dθ.

The following will describe the processing of step S207 when the operation mode is the lift mode.

For example, when the first continuous operation position is located above the first start position P10, specifically, near an image of the forklift truck 20 performing a lowering motion in a situation where the operation mode is the lift mode, the remote CPU 33 sets a value corresponding to the lowering motion (e.g., negative numerical value) as the lift information Dfa. On the other hand, when the first continuous operation position is located below the first start position P10, specifically, near an image of the forklift truck 20 showing a raising motion, the remote CPU 33 sets a value corresponding to the raising motion (e.g., positive numerical value) as the lift information Dfa. The remote CPU 33 sets a larger numerical value as the lift information Dfa as the difference between both the positions in the shorter direction of the touch panel 31 increases. The reach mode and the tilt mode are similar to the above mode except in that the corresponding motions are different.

As described above, the remote CPU 33 sets numerical values corresponding to the relative positions of the first start position P10 and the first continuous operation position (and the manner of operation of the first rotation operation, in addition to the relative positions, during the travel mode) as the information corresponding to the current operation mode. The remote CPU 33 further generates the normal remote operation signal SG12 which includes settings of the above numerical values as information corresponding to the current operation mode, and "0" as the other information.

The information corresponding to the travel mode includes the travel speed information Dv, the acceleration information Dα, and the steering angle information Dθ. The information corresponding to the lift mode is the lift information Dfa. The information corresponding to the reach mode is the reach information Dfb. The information corresponding to the tilt mode is the tilt information Dfc.

In this manner, a motion corresponding to the current operation mode is performed by the forklift truck 20, while the other motions of the forklift truck 20 are prohibited (i.e., restricted) from being performed. Accordingly, the remote CPU 33 permits a remote operation of the motion corresponding to the current operation mode, and prohibits a remote operation of the motions corresponding to the operation modes different from the current operation mode. When attention is paid to this point, the travel mode is considered as an operation mode performing a remote operation associated with traveling, and prohibiting a remote operation associated with the forks 22. Meanwhile, the load-handling mode is considered as an operation mode performing a remote operation associated with the forks 22, and prohibiting a remote operation associated with traveling.

In addition, the processing of step S207 is also considered as a process determining (i.e., controlling) a manner of operation of the remote operation of the forklift truck 20 in accordance with at least either the relative positions of the first start position P10 and the first continuous operation position, or the operation angle.

According to the present embodiment, the information set as the normal remote operation signal SG12 changes in accordance with the manner of operation of the first continuous operation (first continuous operation position), but does not depend on the manner of operation of the second continuous operation. Accordingly, the second continuous operation is a condition for performing a remote operation, but is not included in elements which determine a specific manner of operation of the remote operation.

Thereafter, the remote CPU 33 transmits the normal remote operation signal SG12 in step S208. The normal remote operation signal SG12 is received by the vehicle communication unit 28, and converted into the control signal SGa by the signal converting unit 29. The converted control signal SGa is input to the vehicle CPU 25. The vehicle CPU 25 controls either one of the actuators 23 and 24 based on the control signal SGa. In this manner, the forklift truck 20 performs a motion corresponding to the current operation mode, the first continuous operation position, and the like.

Thereafter, the remote CPU 33 updates information stored in the steering angle storage unit 46 in step S209, and ends this process of the operation mode. Specifically, as shown in FIG. 2, the steering angle storage unit 46 is included in the remote operation program 40. In step S209, the remote CPU 33 updates storage information stored in the steering angle storage unit 46 to the steering angle information Dθ set as the normal remote operation signal SG12 transmitted in step S208.

Accordingly, in a situation where the control mode is the operation mode, the remote communication unit 36 periodically transmits the normal remote operation signal SG12 including the setting of the steering angle corresponding to the manner operation of the first rotation operation. The remote CPU 33 updates the steering angle stored in the steering angle storage unit 46 to the steering angle (steering angle information Dθ) set as the normal remote operation signal SG12 each time the normal remote operation signal SG12 is transmitted. In this manner, the remote CPU 33 can determine the latest steering angle by reading out the storage information stored in the steering angle storage unit 46.

As described above, the forklift truck 20 travels based on the information set as the normal remote operation signal SG12. It is therefore assumed that the actual steering angle of the forklift truck 20 coincides with the steering angle stored in the steering angle storage unit 46. Accordingly, the remote CPU 33 can determine the current steering angle of the forklift truck 20 by reading out the storage information stored in the steering angle storage unit 46.

When at least either the first continuous operation or the second continuous operation is not made, the remote CPU 33 deletes the information associated with the first start position P10 and stored in the start position storage unit 44, and also deletes the information associated with the first continuous operation position and stored in the tracking storage unit 45, in step S210.

Thereafter, the remote CPU 33 shifts the control mode from the operation mode to the forced stop mode in step S211. Specifically, the remote CPU 33 updates the control mode specifying information to information corresponding to the forced stop mode.

Subsequently, the remote CPU 33 performs forced stop control for forcibly stopping the forklift truck 20 in steps S212 and S213. According to the present embodiment, a forced stop condition which is an execution condition of the forced stop control is a condition that at least either the first continuous operation or the second continuous operation is no longer made.

Specifically, in step S212, the remote CPU 33 sets forced stop information for forcibly stopping the motion of the forklift truck 20 as the remote operation signal SG1, regardless of the operation performed for the remote operation device 30.

Specifically, when the current operation mode is the travel mode, the remote CPU 33 sets a forced stop deceleration as the acceleration information Dα, sets a steering angle stored in the steering angle storage unit 46 as the steering angle information Dθ, and sets "0" as other information. Accordingly, the forced stop information in the travel mode is information which includes a setting of the forced stop deceleration as the acceleration information Dα, a setting of the steering angle stored in the steering angle storage unit 46 as the steering angle information Dθ, and a setting of "0" as other information.

When the current operation mode is the load-handling mode, the remote CPU 33 sets forced stop information which includes a setting of "0" as each of the traveling operation information D1 and the load-handling operation information D2 as the remote operation signal SG1.

In step S213, the remote CPU 33 transmits, using the remote communication unit 36, a forced stop remote operation signal SG13 which is the remote operation signal SG1 including the setting of the forced stop information. The forced stop remote operation signal SG13 is the remote operation signal SG1 that is not affected by the operation performed for the remote operation device 30.

The forklift truck 20 having received the forced stop remote operation signal SG13 is forcibly stopped. Specifically, in a case that the forklift truck 20 is traveling, the forklift truck 20 is decelerated at the forced stop deceleration and stopped while maintaining the current steering angle, and in a case that the forks 22 are in a motion, the motion of the forks 22 is immediately stopped. Accordingly, the remote CPU 33 decelerates and forcibly stops the forklift truck 20 while maintaining the steering angle formed at the time when at least one of both the continuous operations is no longer made, based on the state that at least one of both the continuous operations is not made, in a situation where the remote operation of traveling of the forklift truck 20 is performed using the remote operation device 30.

In practice, the steering angle stored in the steering angle storage unit 46 is a value set in the remote operation control process that is previously performed with respect to the remote operation control process that is performed when the forced stop condition is met. However, the execution period of the remote operation control process is sufficiently short for the manner of operation performed by the operator. Accordingly, the steering angle stored in the steering angle storage unit 46 is considered as the steering angle of the forklift truck 20 when the forced stop condition is met.

According to the configuration, after a shift from the in-stop mode to the operation mode (i.e., after the start of the remote operation), the remote operation is continued in a state where both the continuous operations are determined. On the other hand, the forklift truck 20 is forcibly stopped, and the remote operation using the remote operation device 30 is stopped based on determination that at least one of both the continuous operations is not made.

As described above, the state where the remote operation is stopped refers to a state where the forklift truck 20 does not perform a motion that corresponds to any one of the various operations even when the corresponding operation of the various operations is performed for the remote operation device 30. Accordingly, the state where the forklift truck 20 maintains the forced stop or the stop state based on the forced stop remote operation signal SG13 or the remote operation-in-stop signal SG11 transmitted regardless of the types of the various operations performed for the remote operation device 30, is also considered as the state where the remote operation by the remote operation device 30 is stopped.

It is assumed herein that a series of input operations including the first start operation and the first continuous operation are referred to as first operations, and that a series of input operations including the second start operation and the second continuous operation are referred to as second operations. The first operations are a series of input operations made to the touch panel 31 and limited to the inside of the first area A1 before the start of the remote operation, and not limited to the inside of the first area A1 after the start of the remote operation. The second operations are a series of input operations made to the inside of the second area A2 performed either before or after the start of the remote operation.

In this case, the remote CPU 33 is considered to perform the remote operation when both the first operations and the second operations are performed. The remote CPU 33 is also considered to stop the remote operation and perform the forced stop control based on the state where at least either the first operations or the second operations are not performed.

As shown in FIG. 7, the remote CPU 33 advances the process to step S114 when the current control mode is not the operation mode. In this case, a forced stop process corresponding to the forced stop mode is executed, and this remote operation control process ends. The forced stop process is a process which continues the forced stop control until completion of the forced stop of the forklift truck 20, and shifts the control mode to the in-stop mode after completion of the forced stop.

Figure 11:
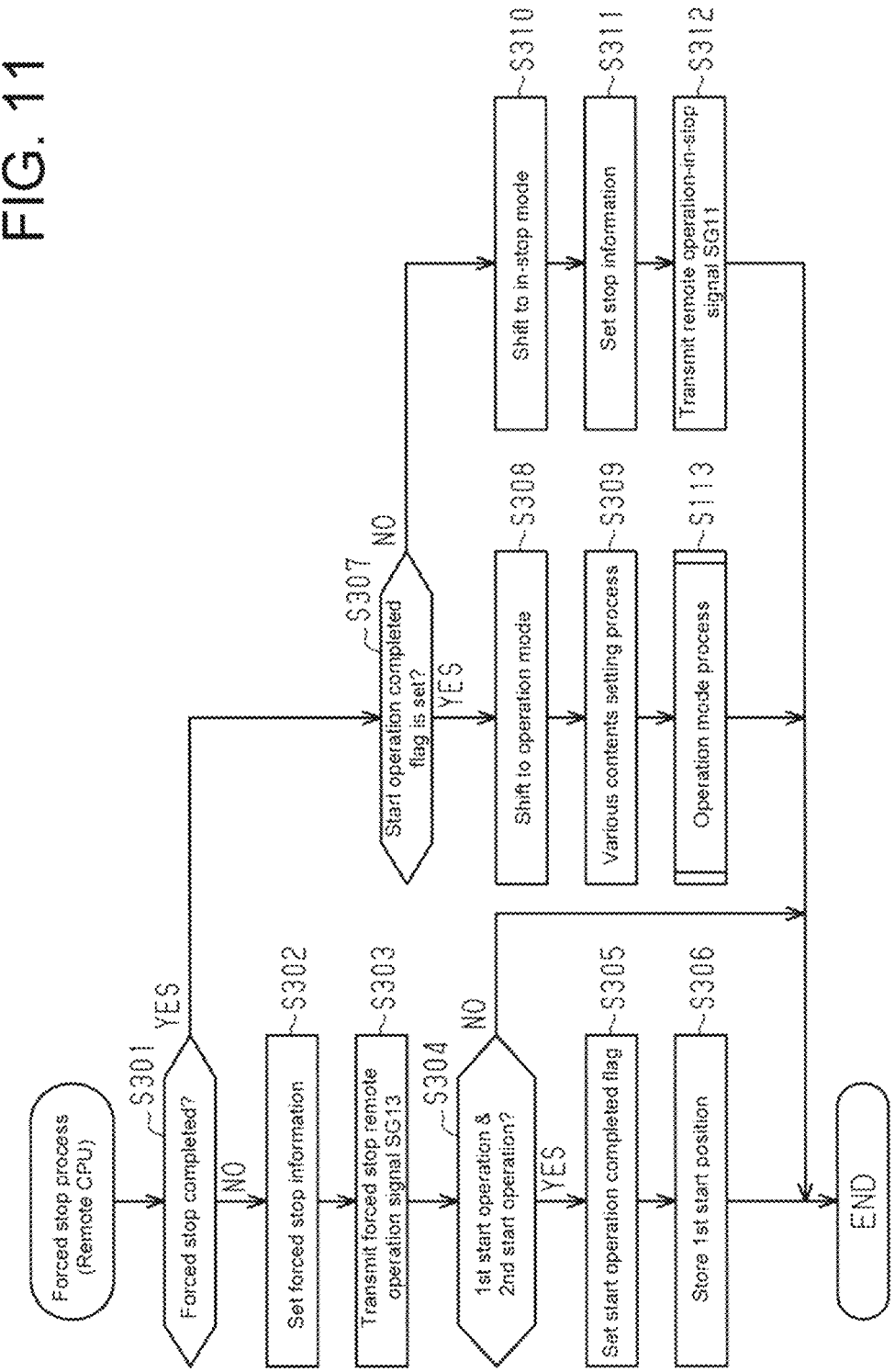
FIG. 11 is a flowchart showing a forced stop process.

The following will describe the forced stop process with reference to FIG. 11.

As shown in FIG. 11, the remote CPU 33 determines whether or not the forced stop of the forklift truck 20 has been completed in step S301. Specifically, the vehicle CPU 25 determines the traveling status of the forklift truck 20 and the motion status of the forks 22 based on a detection result obtained by the vehicle state detection unit 27, and periodically transmits a motion status signal which includes a setting of a determination result thus obtained to the remote communication unit 36 using the vehicle communication unit 28. The remote CPU 33 is configured to determine the traveling status of the forklift truck 20 and the motion status of the forks 22 based on the motion status signal received by the remote communication unit 36. In step S301, the remote CPU 33 thus configured determines whether or not both the traveling of the forklift truck 20 and the motion of the forks 22 are stopped.

When it is determined that the forced stop has not been completed, the remote CPU 33 continues the forced stop control. Specifically, the remote CPU 33 executes processing associated with transmission of the forced stop remote operation signal SG13 in steps S302 and S303. For example, when the operation mode is the travel mode, the remote CPU 33 transmits the forced stop remote operation signal SG13 which includes a setting of a forced stop deceleration as the acceleration information Dα, a setting of a steering angle stored in the steering angle storage unit 46 as the steering angle information Dθ, and a setting of "0" as other information.

Thereafter, the remote CPU 33 determines whether or not both the start operations are performed in step S304. When it is determined that both the start operations are not performed, the remote CPU 33 ends the forced stop process without change. When it is determined that both the start operations are performed, the remote CPU 33 advances the process to step S305. The remote CPU 33 which executes the processing of step S304 corresponds to the "determination unit".

In step S305, the remote CPU 33 sets a start operation completed flag indicating that both the start operations have been performed. This start operation completed flag is set in a predetermined storage area of the remote operation program 40, for example.

Thereafter, the remote CPU 33 executes processing of step S306, and ends the forced stop process. The processing of step S306 is identical to the processing of step S105.

On the other hand, when it is determined that the forced stop has been completed, the remote CPU 33 makes an affirmative determination in step S301, and advances the process to step S307, where it is determined whether or not the start operation completed flag has been set.

When it is determined that the start operation completed flag has been set, the remote CPU 33 shifts the control mode from the forced stop mode to the operation mode in step S308.

In the subsequent step S309, the remote CPU 33 sets various contents for starting the remote operation based on both the start operations performed during the forced stop control. Specifically, the remote CPU 33 deletes the start operation completed flag. Thereafter, the remote CPU 33 starts tracking while considering that both the start operations are performed, and designating the first start operation associated with the first start position P10 stored in step S306 as the first start operation at the start of the remote operation. The first continuous operation and the second continuous operation in this case are operations continued from the first start operation designated as above in step S309 and the second start operation.

Thereafter, the remote CPU 33 executes process of the operation mode of step S113, and ends this forced stop process.

On the other hand, when it is determined that the start operation completed flag has not been set, the remote CPU 33 shifts the control mode from the forced stop mode to the in-stop mode in step S310. Specifically, the remote CPU 33 updates the control mode specifying information to information corresponding to the in-stop mode. Subsequently, the remote CPU 33 executes processing of step S311 and step S312, and ends this forced stop process. The processing of step S311 and step S312 are identical to the processing in step S107 and step S108, respectively.

According to the present embodiment, the processing of steps S212, S213, S302, and S303 corresponds to the "forced stop control" or the "forced stop control step", while the remote CPU 33 executing the processing of these steps corresponds to the "forced stop control unit".

According to the configuration, the forced stop control is continued until the forced stop is completed, specifically, until the motion of the forklift truck 20 (traveling or motion of the forks 22) is completed. During the forced stop control, the control mode does not shift to the operation mode.

Accordingly, the remote operation performed based on the operation by the operator is stopped.

When both the start operations are performed during the forced stop control, the control mode shifts to the operation mode after the forced stop control. In this manner, the remote operation based on the operation by the operator is immediately re-started after the forced stop of the forklift truck 20.

According to the present embodiment, the position of the first start operation at the time of execution of both the start operations is set as the first start position P10 when the remote operation based on execution of both the start operations during the forced stop control is re-started. However, the position of the first start operation at the time of the re-start (start) of the remote operation may be set as the first start position P10.

On the other hand, when both the start operations are not performed during the forced stop control, the control mode shifts to the in-stop mode after the forced stop control. In this manner, the state where the remote operation based on the operation by the operator is stopped continues even after the forced stop of the forklift truck 20.

Effects of the present embodiment will be next described with reference to FIGS. 12 to 15.

Figure 12:
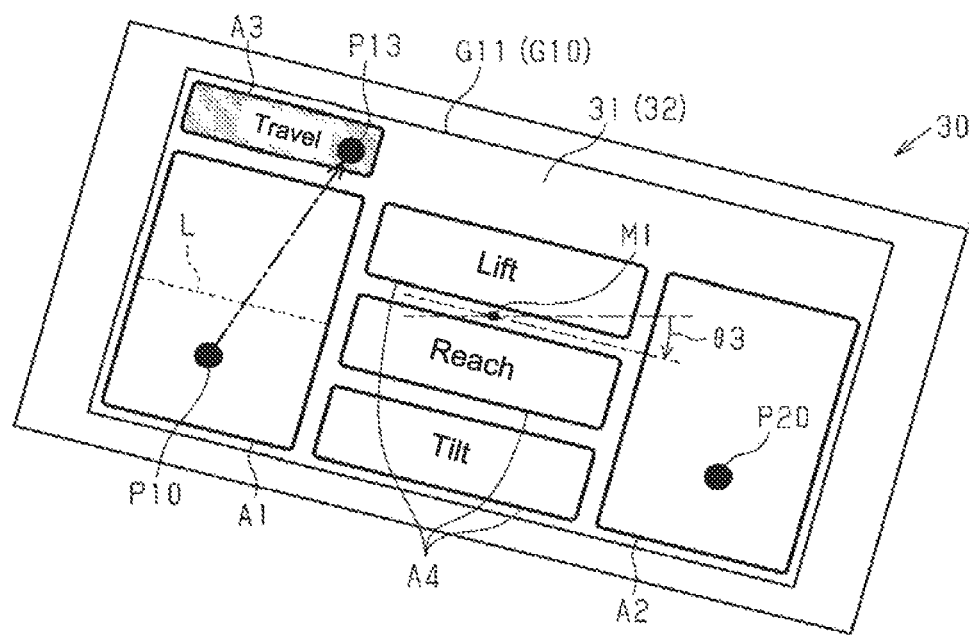
FIG. 12 is a front view of the remote operation device schematically showing an operation performed for the remote operation device.
Figure 13:
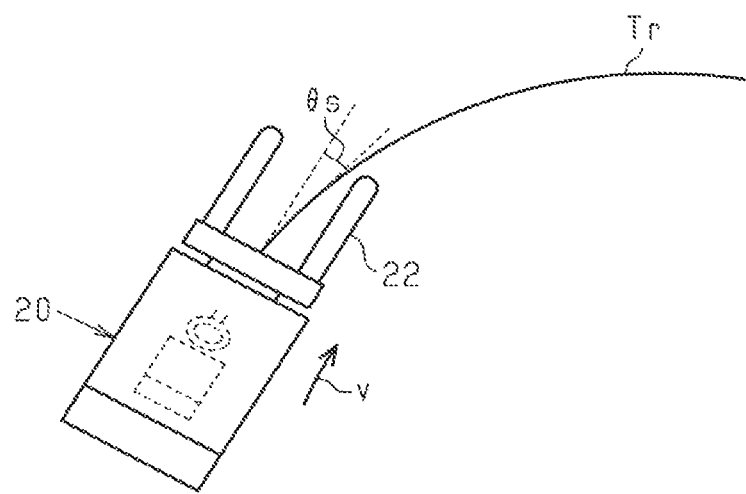
FIG. 13 is a schematic diagram showing a forklift truck in traveling.

As shown in FIG. 12, suppose that a swipe operation is performed from the first start position P10 to the third predetermined position P13, and that the first rotation operation is performed clockwise by a third angle θ3 from the start of the remote operation as viewed from the operator in a situation where the second continuous operation is performed in the travel mode. In this case, as shown in FIG. 13, the forklift truck 20 is remotely operated in such a manner as to turn to the right at a travel speed v corresponding to the relative positions of the first start position P10 and the third predetermined position P13, and at a steering angle corresponding to the third angle θ3 (θs in FIG. 13). As a result, the forklift truck 20 travels in correspondence with the operations (first continuous operation and first rotation operation) performed for the remote operation device 30. In this case, it is assumed that the forklift truck 20 travels along a trajectory Tr associated with the steering angle (θs) corresponding to the third angle 83 when the position of the remote operation device 30 is maintained.

Figure 14:
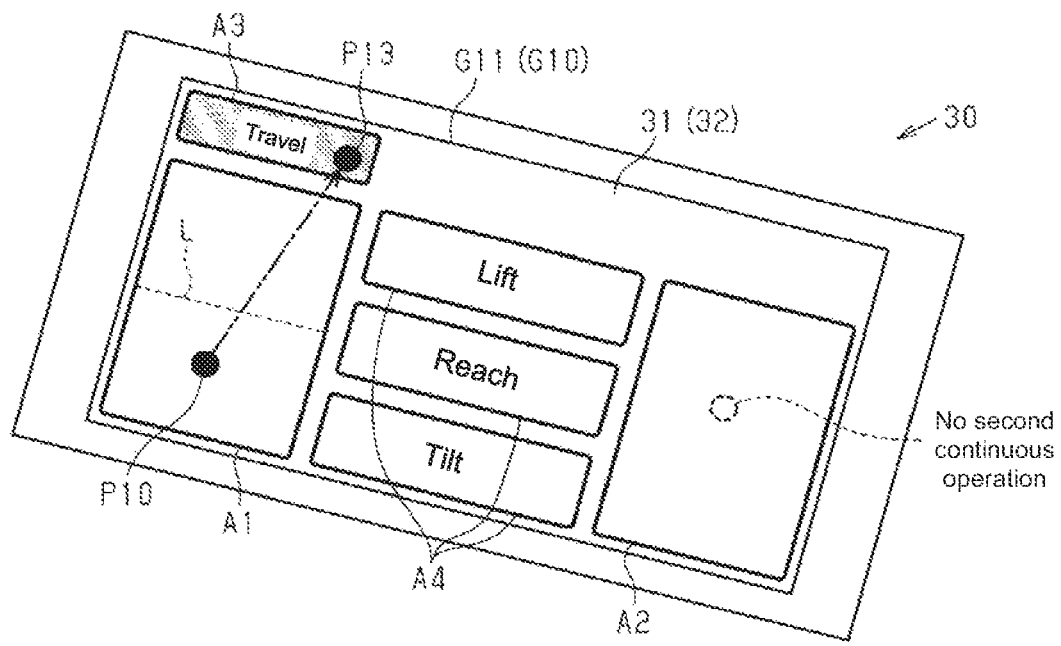
FIG. 14 is a front view of the remote operation device schematically showing an operation performed for the remote operation device.

In this situation, that is, in the course of turning of the forklift truck 20 (during turning), it is assumed that the second continuous operation is not performed by the remote operation device 30 as shown in FIG. 14. In this case, forced stop control of the forklift truck 20 is started. For example, suppose that the forced stop control is started at a point Px in FIG. 15.

Figure 15:
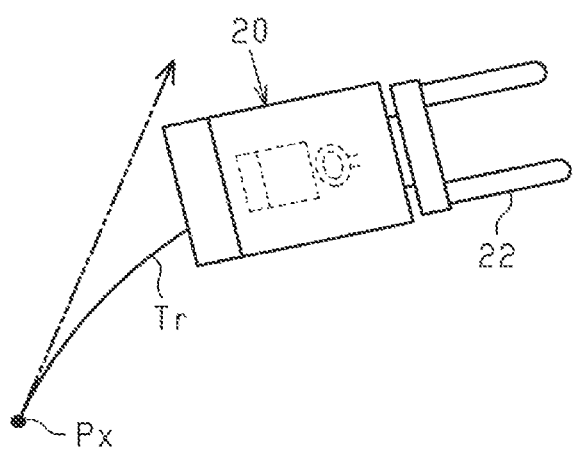
FIG. 15 is a schematic diagram showing the forklift truck forcibly stopped.

In this case, if forced stop control is performed in a state where the steering angle is set to neutral, the forklift truck 20 travels while deviating from the trajectory Tr assumed by the operator as shown by a two-dot chain line in FIG. 15, and then stops.

According to the present embodiment, however, the forklift truck 20 decelerates at the forced stop deceleration and stops while maintaining the steering angle formed when the forced stop condition is met, regardless of the manner of operation of the first rotation operation. In this case, the forklift truck 20 travels for a braking distance corresponding to the forced stop along the trajectory Tr assumed by the operator, and then stops. Accordingly, traveling of the forklift truck 20 in a direction not intended by the operator is avoided during the forced stop.

According to the embodiment detailed above, following advantageous effects are offered.

(1) The industrial vehicle remote operation system 10 includes the forklift truck 20 which includes the vehicle communication unit 28, and the remote operation device 30 which includes the remote communication unit 36 performing wireless communication with the vehicle communication unit 28. The remote operation device 30 includes the remote CPU 33 which performs forced stop control for decelerating and forcibly stopping traveling of the forklift truck 20 while maintaining the steering angle of the forklift truck 20 formed when the forced stop condition is met, in a case where the forced stop condition is met during the remote operation of traveling of the forklift truck 20 using the remote operation device 30. In other words, a remote operation method of the forklift truck 20 of the present embodiment (industrial vehicle remote operation method) has a process of performing forced stop control.

According to the configuration, the forklift truck 20 is forcibly stopped when the forced stop condition is met while the forklift truck 20 is traveling. With this configuration, continuation of traveling of the forklift truck 20 in an inappropriate situation for remote operation, such as a situation where the remote operation device 30 is not held with both hands, is prevented, and therefore the safety is improved.

The forklift truck 20 herein travels for a braking distance from the start of the forced stop until completion of the forced stop. In this case, the safety and operability may be lowered when the forklift truck 20 travels in a direction not intended by the operator.

According to the present embodiment, however, the forklift truck 20 is decelerated and forcibly stopped while maintaining the steering angle of the forklift truck 20 set when the forced stop condition is met. With this configuration, the forklift truck 20 is expected to travel along the trajectory Tr assumed by the operator even during the forced stop control. Accordingly, traveling of the forklift truck 20 in a direction not intended by the operator during the forced stop of the forklift truck 20 may be reduced.

In particular, the forced stop control is such control which achieves a stop at a forced stop deceleration. Accordingly, when the operator desires to stop the forklift truck 20 when positioning of the forklift truck 20, for example, the operator may intentionally establish the forced stop condition. When the forced stop condition is intentionally established in this manner, it is not preferable to make a stop with deviation from the trajectory Tr assumed by the operator.

According to the present embodiment, however, the forklift truck 20 is assumed to travel along the trajectory Tr assumed by the operator during the forced stop control. In this case, the forklift truck 20 can be stopped at a desired position by intentionally establishing the forced stop condition. Accordingly, the operability is improved.

(2) The remote CPU 33 restricts such that the remote operation corresponding to the operation performed for the remote operation device 30 is not executed during the forced stop control. Specifically, in the forced stop mode performing the forced stop control, the remote CPU 33 transmits not the normal remote operation signal SG12 corresponding to the operation performed for the remote operation device 30, but the forced stop remote operation signal SG13 not affected by the operation performed for the remote operation device 30 to forcibly stop the forklift truck 20.

According to the configuration, the remote operation of the forklift truck 20 is not performed during the forced stop control. Thus, inconveniences caused by the remote operation again performed during the forced stop control may be reduced.

More specifically, for example, suppose that the forced stop control is performed by temporarily releasing the finger from the touch panel 31 during both the continuous operations, and that both the start operations are subsequently performed during the forced stop control by again performing the input operation to the touch panel 31 immediately after the forced stop control. In this case, it is also considered to suspend the forced stop control and shift the control mode from the forced stop mode to the operation mode. However, when the remote operation is performed with suspension of the forced stop control, behaviors of the forklift truck 20 are likely to become unstable.

According to the present embodiment, however, the remote operation is not performed during the forced stop control. In this case, re-execution of the remote operation after an intermediate stop of the forced stop control is avoidable, wherefore unstable behaviors of the forklift truck 20 may be reduced.

(3) The remote CPU 33 executes the processing of step S304 for determining whether or not both the start operations are performed during the forced stop control. When both the start operations are made during the forced stop control, the remote CPU 33 shifts the control mode to the operation mode after an end of the forced stop control. When both the start operations are not made during the forced stop control, the control mode is shifted to the in-stop mode after an end of the forced stop control. The operation mode is a control mode which causes a remote operation corresponding to the operation performed for the remote operation device 30, while the in-stop mode is a control mode in which the remote operation corresponding to the operation performed for the remote operation device 30 is not performed.

According to the configuration, execution of the remote operation is permitted after an end of the forced stop control when both the start operations are made during the forced stop control. On the other hand, execution of the remote operation is prohibited after an end of the forced stop control when both the start operations are not made during the forced stop control. The configuration avoids inconvenience that the remote operation is not performed even in a state where both the start operations are made during the forced stop control, while reducing a re-start of the remote operation under an inappropriate situation.

(4) The remote CPU 33 executes the processing of step S102 and step S103 for determining whether or not the remote operation start condition is met (specifically, whether or not both the start operations have been made) in the in-stop mode. When it is determined that both the start operations have been made in the in-stop mode, the remote CPU 33 shifts the control mode from the in-stop mode to the operation mode. In this case, a re-start of the remote operation may be achieved by performing both the start operations after the forced stop. Accordingly, the forced stop and the re-start of the remote operation may be performed as necessary.

(5) The remote CPU 33 provided on the remote operation device 30 transmits the forced stop remote operation signal SG13 using the remote communication unit 36 in the forced stop control. The forced stop remote operation signal SG13 includes settings of the steering angle of the forklift truck 20 formed when the forced stop condition is met, and the forced stop deceleration. When the forced stop remote operation signal SG13 is received by the vehicle communication unit 28, the forklift truck 20 is forcibly stopped based on the settings of the steering angle and the forced stop deceleration included in the forced stop remote operation signal SG13. According to the configuration, the vehicle CPU 25 of the forklift truck 20 does not require a special process to be executed for achieving a forced stop while maintaining the steering angle. The configuration therefore eliminates the necessity of updating the vehicle memory 26 and the like of the forklift truck 20 for executing the special process, and the versatility is improved.

(6) The remote operation device 30 includes the steering angle storage unit 46 which stores the steering angle of the forklift truck 20 formed when the forced stop condition is met. The remote CPU 33 transmits the forced stop remote operation signal SG13 which includes the setting of the steering angle stored in the steering angle storage unit 46 in the forced stop control. According to the configuration, there is no necessity of waiting for transmission of information associated with the current steering angle from the forklift truck 20 before performing the forced stop control, so that the forced stop control may be executed in an early stage after the forced stop condition is met. The configuration therefore reduces the period from the time when the forced stop condition is met until the forklift truck 20 is forcibly stopped.

(7) When the first operations and the second operations are performed for the remote operation device 30 (specifically, for the touch panel 31), the remote CPU 33 performs the remote control of traveling of the forklift truck 20 based on at least the manner of operation of the first operation (specifically, the manner of operation of the first operations and the manner of operation of the first rotation operation). The forced stop condition is a condition that at least either the first operations or the second operations are not performed.

According to the configuration, the remote operation is performed when the first operations and the second operations are made. Meanwhile, the forced stop control is performed based on the state where at least either the first operations or the second operations are no longer made. With this configuration, the forklift truck 20 is forcibly stopped by an erroneous inexecution of at least either the first operations or the second operations, so that the safety is improved. In addition, an intentional forced stop of the forklift truck 20 may be achieved by intentionally prohibiting execution of at least either the first operations or the second operations, for example. With this configuration, execution of the forced stop is facilitated, and the operability is improved.

(8) The remote operation device 30 includes the touch panel 31, and the touch sensor 32 which detects an input operation to the touch panel 31. The remote CPU 33 displays the operation image G10 on the touch panel 31. The operation image G10 has the first area A1 and the second area A2 disposed at different positions. The first operations are a series of input operations which include the first start operation as an input operation to the inside of the first area A1, and the first continuous operation as an input operation made to the touch panel 31 and continued from the first start operation at the start of the remote operation. The second operations are a series of input operations which include the second start operation as an input operation to the inside of the second area A2, and the second continuous operation as an input operation made to the second area A2 and continued from the second start operation at the start of the remote operation.

The configuration requires execution of an input operation to each of targeted locations, i.e., the both areas A1 and A2 that are disposed at different positions of the touch panel 31 to start the remote operation. It is therefore assumed that the operator holds the remote operation device 30 with both hands to perform an input operation to each of the two different positions. Accordingly, the configuration prevents a remote operation with one hand and, therefore, prevents a simultaneous operation of a remote operation and a different work.

According to the present configuration, forced stop control is performed only by releasing a finger or the like from the touch panel 31, for example. In this case, the forklift truck 20 is forcibly stopped when the finger is released from the touch panel 31 to perform a different work during the remote operation, for example. Accordingly, execution of other work during the remote operation may be reduced. In addition, an intentional forced stop may be easily and quickly achieved only by releasing the finger from the touch panel 31.

(9) The remote CPU 33 performs a remote operation of the forklift truck 20 not based on the manner of operation of the second continuous operation but on the manner of operation of the first continuous operation during the remote operation (specifically, when both the continuous operations are performed). According to the configuration, the manner of operation of the first continuous operation affects the remote operation of the forklift truck 20, while the manner of operation of the second continuous operation does not affect the remote operation of the forklift truck 20. In this case, the operator is only required to concentrate on the manner of operation of the first continuous operation, wherefore the operation may be facilitated. Accordingly, erroneous operation of the forklift truck 20 may be reduced.

(10) The remote CPU 33 controls a manner of remote operation of the forklift truck 20 based on relative positions of the first start position P10 which is a position where the first start operation is made at the start of the remote operation, and the first continuous operation position which is a position where the first continuous operation is made. According to the configuration, the forklift truck 20 may perform a desired motion in accordance with a swipe operation with a finger or the like.

In particular, according to the present embodiment, the relative positions of the first start position P10 and the first continuous operation position are adopted as the manner of operation of the first continuous operation to control the manner of remote operation in accordance with the relative positions. However, the absolute values of both the positions do not affect the manner of the remote operation. With this configuration, the degree of freedom of operations increases, and the operability is improved.

Specifically, when the absolute value of the first start position P10 or the first continuous operation position affects the manner of remote operation, the position of the tapping needs to be strictly adjusted in the first start operation and the first continuous operation to perform a desired remote operation. In this case, the operability is lowered. In addition, the operator is likely to perform an operation while viewing the operation image G10 rather than the forklift truck 20. In this case, the safety may be lowered.

According to the present embodiment, however, the manner of the remote operation of the forklift truck 20 is controllable by a series of input operations (specifically, swipe operation) continued from the first start operation at the start of the remote operation. Accordingly, position of tapping is not strictly limited, so that the operability is improved.

If the manner of the remote operation is determined based on relative positions of a predetermined specified position and the first continuous operation position rather than the first start position P10, the range of the swipe operation is limited. In this case, the manner of the remote operation may be limited.

According to the present embodiment, however, the range of the swipe operation may be adjusted by controlling the first start position P10. For example, as shown in FIG. 12, a range of an upward swipe operation is increased by setting the first start position P10 below the centerline L. In this manner, a motion performed based on the upward swipe operation (advancement in the traveling mode) can be more accurately controlled, or a settable speed range can be further increased.

(11) The first continuous operation is an input operation made to the touch panel 31 and continued from the first start operation at the start of the remote operation either on the inside or the outside of the first area A1. The second continuous operation is an input operation continued from the second start operation at the start of the remote operation and made to the inside of the second area A2.

According to the configuration, a swipe operation that may go to the outside of the first area A1 is allowed in the first continuous operation. Accordingly, the degree of freedom of the first continuous operation may increase. In addition, the remote operation is continued even when the first continuous operation position is moved to the outside of the first area A1 to achieve a desired manner of remote operation. Accordingly, the operability and usability are improved.

On the other hand, the second continuous operation is an input operation to the inside of the second area A2. In this case, the forced stop is performed when the finger separates from the second area A2 or swipes and touches the outside of the second area A2. Accordingly, execution of other work during the remote operation is reduced, so that the safety is improved.

In this case, the second continuous operation is an operation necessary for continuing the remote operation of the forklift truck 20, but does not contribute to the manner of the remote operation. An operation such as changing the second continuous operation position is therefore unnecessary. Accordingly, even when the second continuous operation is limited to an input operation to the inside of the second area A2 as described above, inconvenience such as the lowered operability is unlikely to occur.

(12) The forklift truck 20 includes the travel actuator 23 used for traveling of the forklift truck 20, and the load actuator 24 used for a motion of the forks 22 as a motion different from traveling. As the operation mode, the remote CPU 33 has the travel mode which is directed to the travel actuator 23 as an operation target, and the load-handling mode (lift mode, reach mode, or tilt mode) which is directed to the load actuator 24 as an operation target. The remote CPU 33 controls the travel actuator 23 based on the manner of operation of the first continuous operation in the travel mode, and controls the load actuator 24 based on the manner of operation of the first continuous operation in the load-handling mode.

According to the configuration, the travel mode and the load-handling mode as the operation modes are set separately from each other. The configuration may reduce simultaneous execution of the remote operation associated with traveling of the forklift truck 20 and the remote operation associated with the motion of the forks 22, and therefore may reduce erroneous operations.

In addition, the actuators 23 and 24 in both the travel mode and the load-handling mode are controlled based on the manner of operation of the first continuous operation (first operations). In this case, the forklift truck 20 may be remotely operated by a common operation regardless of the operation mode. Accordingly, the operation may be simplified.

(13) When an operation mode switching condition is met, the remote CPU 33 executes processing for switching an operation mode (step S110). The operation mode switching condition includes a condition that a switching operation is performed for the remote operation device 30.

According to the configuration, the operation mode is switched based on a state where the operation mode switching condition including the switching operation is met. In this case, the operator may switch the operation mode by performing the switching operation as necessary, and therefore may perform a desired remote operation.

(14) The operation mode switching condition is a condition that the switching operation is made in the situation of the in-stop mode. According to the configuration, the operation mode is switched by performing the switching operation in the situation where the remote operation is stopped. However, in the state where the remote operation is performed, the operation mode is not switched even when the switching operation is made. The configuration may reduce an unintended motion of the forklift truck 20 caused by switching of the operation mode during the remote operation.

(15) The traveling mode setting area A3 for setting the travel mode, and the load-handling mode setting area A4 for setting the load-handling mode are displayed in the operation image G10. The switching operation is an input operation to the traveling mode setting area A3, or an input operation to the load-handling mode setting area A4. According to the configuration, the operation mode may be switched by performing an input operation to the touch panel 31.

The switching operation is herein achieved by input operations to the mode setting areas A3 and A4 provided separately from the two areas A1 and A2. It is therefore assumed that the operator who performs both the start operations or both the continuous operations temporarily releases the right hand or the left hand from the touch panel 31 to perform the switching operation. In this case, the start operations or the continuous operations are automatically stopped. Accordingly, the remote operation stops, and the switching operation is performed in a state where the remote operation has been stopped. As a result, the operator may smoothly switch the operation mode without consciousness of setting the control mode to the in-stop mode. Accordingly, the safety and usability are both achievable.

(16) The first area A1 and the second area A2 are spaced apart from each other, and at least a part of both the mode setting areas A3 and A4, i.e., the respective mode setting areas A4a to A4c of the load-handling mode setting areas A4 in the present embodiment, is disposed between the first area A1 and the second area A2.

According to the configuration, the respective mode setting areas A4a to A4c are disposed between the first area A1 and the second area A2. In this case, either the right hand or the left hand may input an input operation to the respective mode setting areas A4a to A4c. With this configuration, the switching operation is facilitated.

The load-handling mode setting area A4 is disposed between the first area A1 and the second area A2. In this case, an erroneous input operation is unlikely to be made to the load-handling mode setting area A4. Accordingly, reduction of erroneous operation may be achieved.

(17) When the operation mode is the travel mode, the remote CPU 33 displays an image associated with traveling in the first area A1. When the operation mode is the load-handling mode, the remote CPU 33 displays an image associated with a motion of the forks 22 in the first area A1. According to the configuration, the operator may easily check the current operation mode (operation target).

In particular, according to the present embodiment, the manner of the remote operation of the forklift truck 20 is determined by a common operation (specifically, the first operations) regardless of the operation mode. In this case, when the operation mode is different in a state where the same operation is made to the touch panel 31, the forklift truck 20 executes a different motion. Accordingly, accurate determination of the operation mode is needed. In this regard, the image displayed in the first area A1 in the present embodiment is different for each of the operation modes. Accordingly, the operation mode may be easily checked based on the image displayed inside the first area A1.

According to the present embodiment, the manner of the remote operation of the forklift truck 20 is determined by the manner of operation of the first operations triggered by the input operation to the inside of the first area A1. Accordingly, the inside of the first area A1 is considered as a place to which the operator is particularly likely to pay attention in comparison with surroundings of the second area A2 and other parts. Display of an image indicating the operation mode at the location to which the operator is likely to pay attention may reduce an oversight by the operator.

(18) The touch panel 31 has a shape having a longer direction and a shorter direction. Both the areas A1 and A2 are so disposed as to be opposite to each other in the longer direction of the touch panel 31. According to the configuration, both the areas A1 and A2 are so disposed as to be opposite to each other in the longer direction of the touch panel 31, which hinders the input operation to both the areas A1 and A2 with one hand. The configuration therefore urges hold of the remote operation device 30 with both hands. In addition, even when a plurality of fingers of one hand accidentally touch the touch panel 31, an input operation is unlikely to be made to both the areas A1 and A2. With this configuration, therefore, the safety is improved.

(19) The remote operation device 30 is a smartphone or a tablet terminal. According to the configuration, a remote operation of the forklift truck 20 may be realized using an existing general-purpose product.

(20) The remote operation program 40 for remotely operating the forklift truck 20 using the remote operation device 30 includes the remote operation control processing execution program 41 for executing the remote operation control process using the remote CPU 33. The remote operation control process is a process that includes forced stop control. Accordingly, advantageous effects including (1) are offered.

Second Embodiment

The present embodiment is different from the first embodiment in a processing configuration associated with a forced stop, and others. The different points will be described in detail below.

Figure 16:
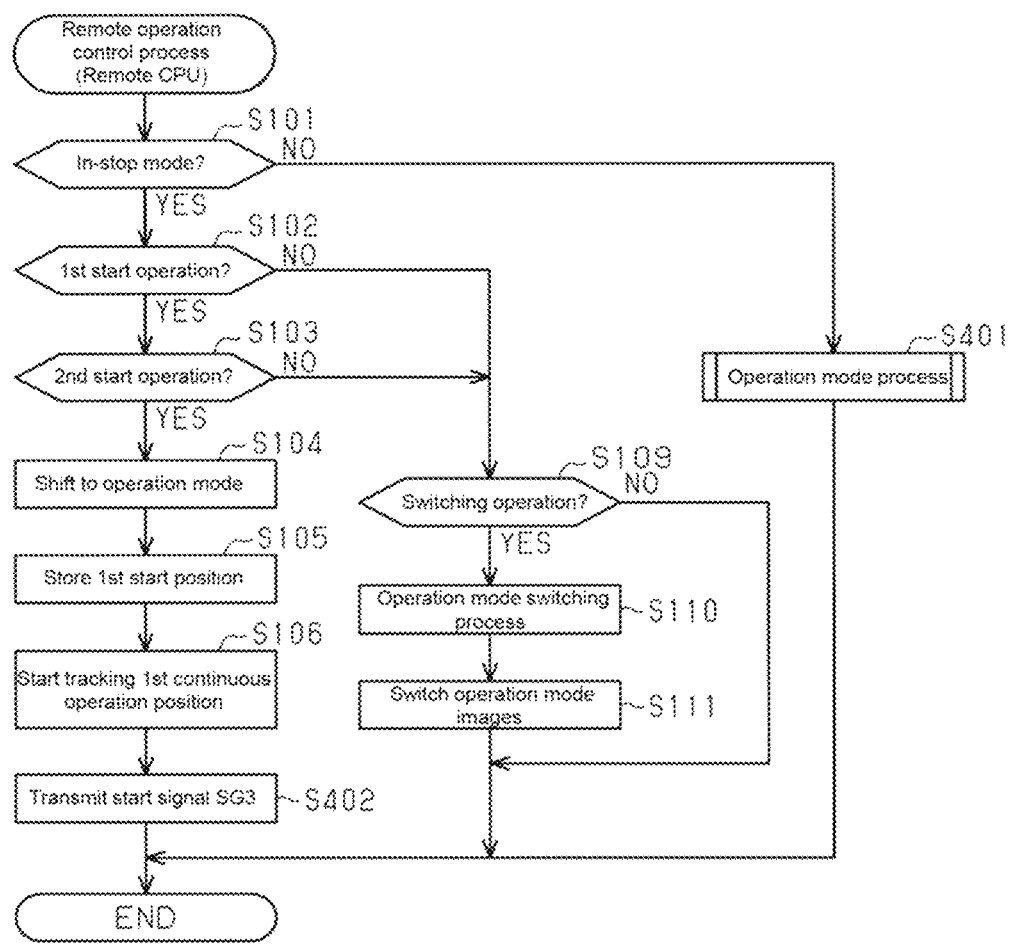
FIG. 16 is a flowchart showing a remote operation control process according to a second embodiment.

A control mode of the present embodiment has two types of modes, i.e., an operation mode which allows a remote operation, and an in-stop mode which stops a remote operation. The control mode of the present embodiment does not have a forced stop mode. According to the present embodiment, therefore, the remote CPU 33 designates the control mode as the operation mode and executes a process of an operation mode in step S401 when a negative determination is made in step S101, as shown in FIG. 16.

According to the present embodiment, the remote CPU 33 transmits a start signal SG3 which instructs a start of a remote operation in step S402 after execution of step S106.

The start signal SG3 is a signal of a communication type exchangeable between the communication units 28 and 36, similarly to the remote operation signal SG1. The start signal SG3 includes a setting of identification information indicating that this signal is the start signal SG3, but does not include settings of the traveling operation information D1 and load-handling operation information D2. The start signal SG3 is also considered as a cancel signal which instructs cancelling of the stop state of the remote operation using the remote operation device 30.

When a negative determination is made in step S109, or after the processing of step S111 is executed, the remote CPU 33 ends this remote operation control process without change.

A process of an operation mode of the present embodiment will be described with reference to FIG. 17.

Figure 17:
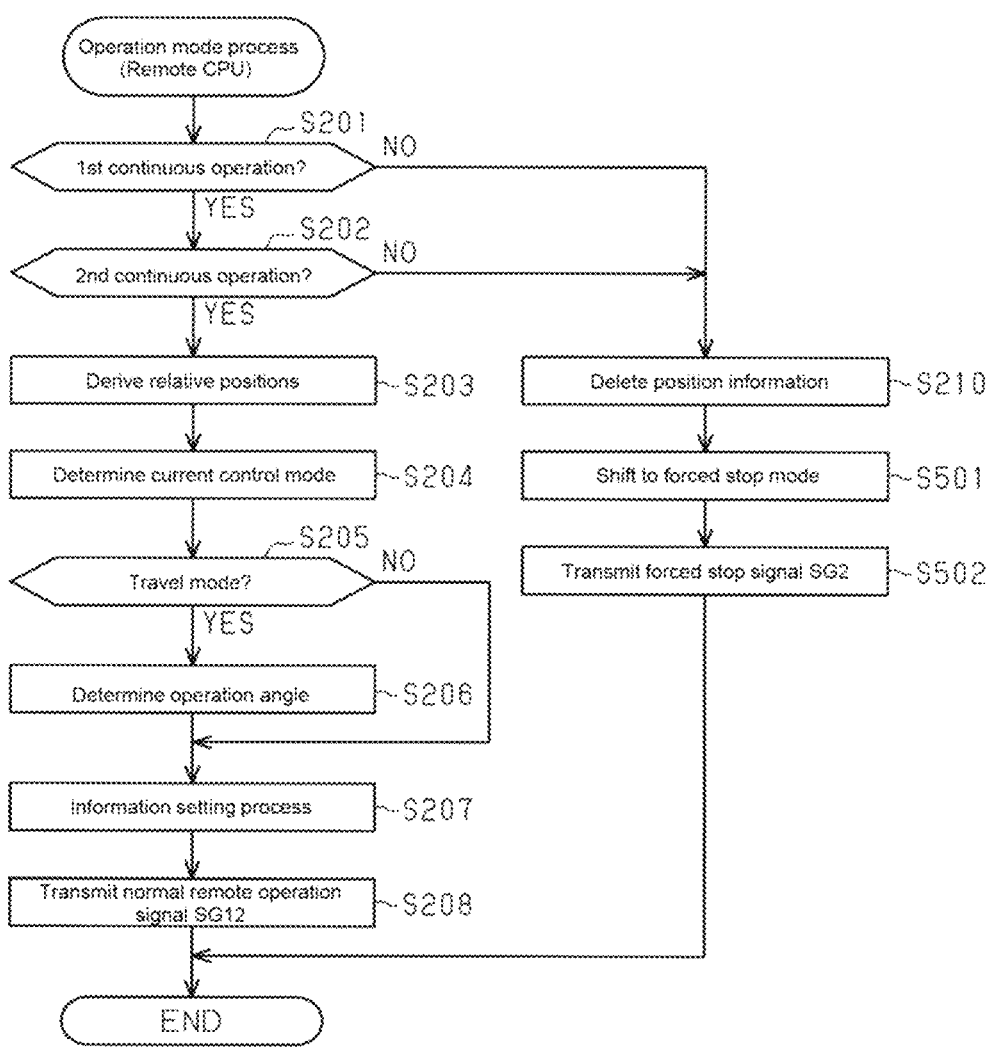
FIG. 17 is a flowchart showing a process of an operation mode according to the second embodiment.

In process of the operation mode of the present embodiment, the remote CPU 33 transmits the normal remote operation signal SG12 in step S208 after executing the processing of step S207, as shown in FIG. 17. The normal remote operation signal SG12 includes identification information indicating that this signal is the remote operation signal SG1, in addition to the traveling operation information D1 and the load-handling operation information D2 corresponding to the operation mode and the manner of operation of the first continuous operation (manner of operation of the first continuous operation and manner of operation of the first rotation operation in the travel mode).

According to the present embodiment, the remote operation program 40 does not include the steering angle storage unit 46, and the processing of step S209 is not performed.

After execution of the processing of step S210, the remote CPU 33 shifts the control mode from the operation mode to the in-stop mode in step S501. Thereafter, the remote CPU 33 executes a process of transmitting a forced stop signal SG2 for instructing a forced stop in step S502, and ends the process of this operation mode.

The forced stop signal SG2 herein is a signal of a communication type which is exchangeable between the communication units 28 and 36, similarly to the remote operation signal SG1. The forced stop signal SG2 includes a setting of identification information indicating that this signal is the forced stop signal SG2, but does not include settings of the traveling operation information D1 and load-handling operation information D2.

When attention is paid to the fact that different types of identification information are included in the remote operation signal SG1, the forced stop signal SG2, and the start signal SG3, these signals are also considered as signals of different types.

The following will next describe the control of the forklift truck 20 performed by the vehicle CPU 25 of the present embodiment.

According to the present embodiment, the vehicle CPU 25 which controls the forklift truck 20 has a remote movable mode and a remote stop mode as vehicle control modes for controlling the forklift truck 20.

The remote movable mode is a vehicle control mode for controlling the forklift truck 20 in accordance with the remote operation signal SG1 based on a state where the remote operation signal SG1 transmitted from the remote communication unit 36 has been received by the vehicle communication unit 28.

The remote stop mode is a vehicle control mode which does not control the forklift truck 20 in accordance with the remote operation signal SG1 even in a state where the remote operation signal SG1 transmitted from the remote communication unit 36 has been received by the vehicle communication unit 28.

When the vehicle communication unit 28 receives a signal from the remote communication unit 36, the signal converting unit 29 converts the received signal into the control signal SGa. The control signal SGa converted by the signal converting unit 29 is input to the vehicle CPU 25.

The signal converting unit 29 also sets identification information included in the received signal as the control signal SGa. In this manner, the vehicle CPU 25 may specify the type of the received signal based on the control signal SGa.

The vehicle CPU 25 identifies the type of the received signal received by the vehicle communication unit 28 based on the input of the control signal SGa, and executes a vehicle control process for controlling a remote operation in accordance with the received signal and the vehicle control mode. Accordingly, the vehicle control process is executed each time a signal is received from the remote communication unit 36.

The vehicle remote operation program 26a of the vehicle memory 26 stores a program for executing the vehicle control process. The vehicle CPU 25 executes the vehicle control process by reading out the program. According to the present embodiment, the vehicle remote operation program 26a of the vehicle memory 26 corresponds to the "industrial vehicle remote operation program".

The vehicle control process will be described with reference to FIG. 18. For convenience of explanation, following contents are described based on signals exchanged between the communication units 28 and 36 instead of the control signal SGa.

Figure 18:
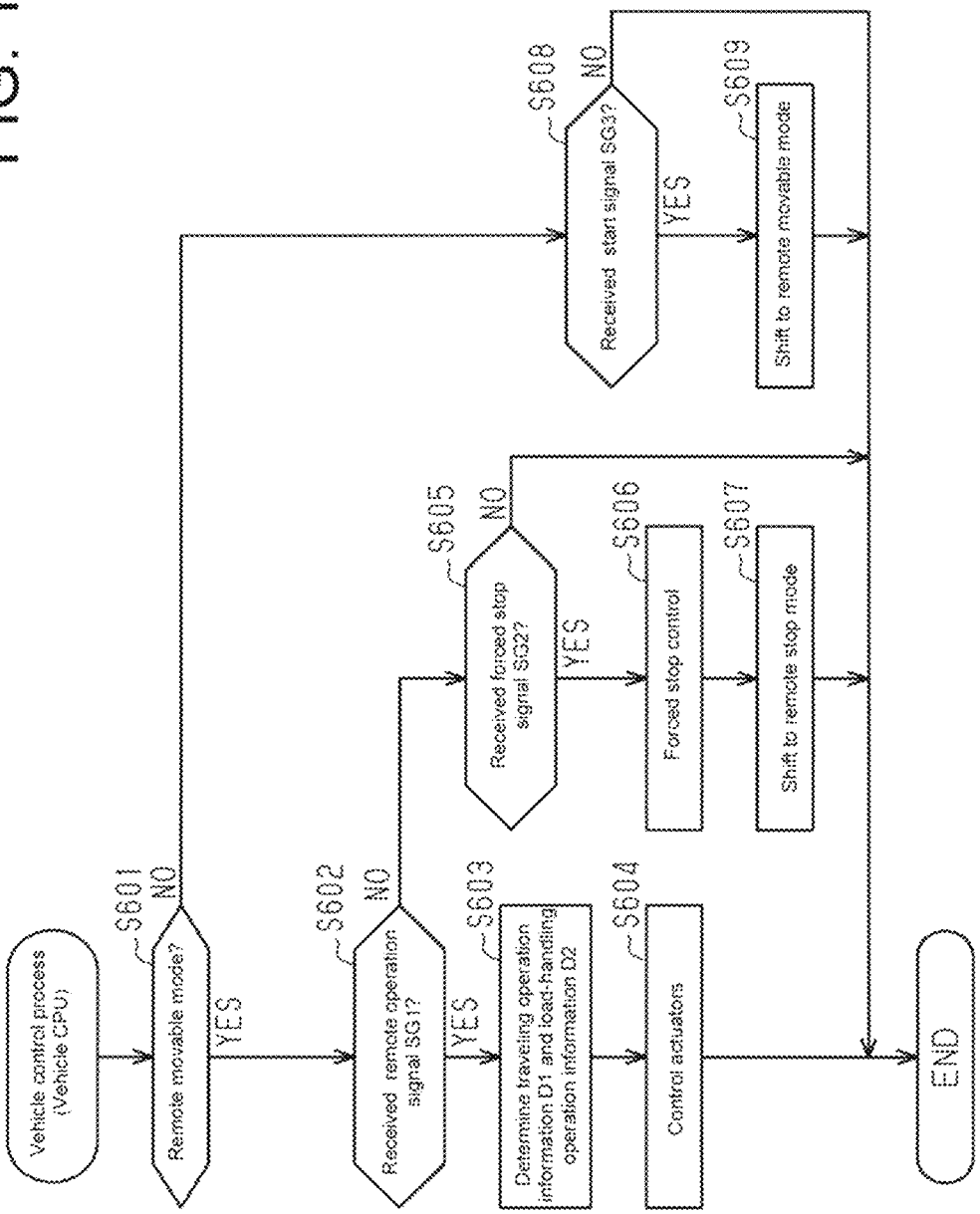
FIG. 18 is a flowchart showing a vehicle control process.

As shown in FIG. 18, the vehicle CPU 25 initially determines whether or not the current vehicle control mode is the remote movable mode in step S601. When the current vehicle control mode is the remote movable mode, the vehicle CPU 25 advances the process to step S602.

In step S602, the vehicle CPU 25 determines whether or not the received signal which triggered execution of the current vehicle control process is the remote operation signal SG1 (specifically, the normal remote operation signal SG12). When the signal currently received is the remote operation signal SG1, the vehicle CPU 25 determines settings of the traveling operation information D1 and the load-handling operation information D2 included in the remote operation signal SG1 (specifically, the control signal SGa converted from the remote operation signal SG1) in step S603.

In subsequent step S604, the vehicle CPU 25 controls the actuators 23 and 24 based on the traveling operation information D1 and the load-handling operation information D2 determined in step S603, and ends this vehicle control process.

On the other hand, when the signal currently received is not the remote operation signal SG1, the vehicle CPU 25 determines whether or not the signal currently received is the forced stop signal SG2 in step S605.

When the received signal is not the forced stop signal SG2, the vehicle CPU 25 ends this vehicle control process without change.

On the other hand, when the received signal is the forced stop signal SG2, the vehicle CPU 25 performs forced stop control for forcibly stopping a motion of the forklift truck 20 in step S606. Accordingly, the forced stop condition of the present embodiment is a condition that the vehicle communication unit 28 receives the forced stop signal SG2.

Specifically, the vehicle CPU 25 initially determines whether or not the current state is a state during a remote control of traveling of the forklift truck 20. The vehicle CPU 25 determines the current steering angle based on a detection result obtained by the vehicle state detection unit 27 when the current state is the state during the remote operation of traveling. Thereafter, the vehicle CPU 25 controls the travel actuator 23 such that deceleration at a forced stop deceleration and a stop are achieved in a state that the current steering angle is maintained.

The vehicle CPU 25 determines whether or not the current state is a state during a remote operation of the forks 22 when the current state is not the state during the remote operation of traveling. When the current state is the state during the remote operation of the forks 22, the vehicle CPU 25 controls the load actuator 24 such that the motion of the forks 22 immediately stops.

The vehicle CPU 25 performs the forced stop control until the motion of the forklift truck 20 stops. Accordingly, even when the vehicle communication unit 28 receives the normal remote operation signal SG12 during the forced stop control, the forced stop control continues. Accordingly, the vehicle CPU 25 is configured not to perform the remote operation based on the remote operation signal SG1 during the forced stop control.

After the forced stop control ends (i.e., after the motion of the forklift truck 20 stops), the vehicle CPU 25 shifts the vehicle control mode from the remote movable mode to the remote stop mode in step S607, and ends this vehicle control process.

Accordingly, when the vehicle communication unit 28 receives the forced stop signal SG2 in a situation where the vehicle control mode is the remote movable mode, the vehicle CPU 25 forcibly stops the forklift truck 20, and shifts the vehicle control mode from the remote movable mode to the remote stop mode.

When the vehicle control mode is the remote stop mode, the vehicle CPU 25 determines whether or not the remote operation start condition is met. When the remote operation start condition is met, the vehicle CPU 25 shifts the vehicle control mode from the remote stop mode to the remote movable mode.

Specifically, when the vehicle control mode is the remote stop mode, the vehicle CPU 25 makes a negative determination in step S601, and advances the process to step S608 to determine whether or not the signal currently received is the start signal SG3, as shown in FIG. 18. The remote operation start condition of the present embodiment is a condition that the vehicle communication unit 28 receives the start signal SG3.

When the signal currently received is not the start signal SG3, the vehicle CPU 25 ends this vehicle control process without change. On the other hand, when the signal currently received is the start signal SG3, the vehicle CPU 25 shifts the vehicle control mode from the remote stop mode to the remote movable mode in step S609, and ends this vehicle control process. In this manner, execution of the remote operation using the remote operation device 30 is allowed.

As described above, the vehicle CPU 25 shifts the vehicle control mode from the remote stop mode to the remote movable mode based on reception of the start signal SG3 by the vehicle communication unit 28 in a situation where the vehicle control mode is the remote stop mode after the forced stop control. In other words, after execution of the forced stop, the vehicle CPU 25 maintains the stopped state of the remote operation until reception of the start signal SG3.

According to the configuration, the forklift truck 20 is forcibly stopped based on reception of the forced stop signal SG2 by the vehicle communication unit 28. Accordingly, the forklift truck 20 may be forcibly stopped even when signals from the remote communication unit 36 discontinue after reception of the forced stop signal SG2 for some reasons.

According to the present embodiment, this vehicle control process ends without executing the processing of steps S603 and S604 when the remote operation signal SG1 is received during the remote stop mode. Accordingly, the remote operation corresponding to the remote operation signal SG1 is not executed during the forced stop control. Accordingly, when the vehicle control mode is the remote stop mode, the forklift truck 20 of the present embodiment is regulated such that the remote operation corresponding to the remote operation signal SG1 is not performed even in a case of reception of the remote operation signal SG1.

According to the present embodiment, the vehicle CPU 25 executes the vehicle control process based on reception of the start signal SG3 after the end of the vehicle control process performing the forced stop control when the start signal SG3 is received during the forced stop control. In this manner, the remote operation is again allowed after the end of the forced stop control when the start signal SG3 is received during the forced stop control.

The processing of step S606 corresponds to the "forced stop control" or the "forced stop control step", while the vehicle CPU 25 executing the processing of these steps corresponds to the "forced stop control unit".

According to the present embodiment detailed above, following advantageous effects are offered.

(21) The vehicle CPU 25 of the forklift truck 20 performs forced stop control for forcibly stopping traveling of the forklift truck 20 by decelerating the forklift truck 20 while maintaining the steering angle of the forklift truck 20 formed when the forced stop condition is met, in a case where the forced stop condition is met during the remote operation of traveling of the forklift truck 20 using the remote operation device 30. According to the configuration, advantageous effects including (1) are offered.

In particular, according to the present embodiment, the forklift truck 20 is forcibly stopped without periodically transmitting signals from the remote communication unit 36 to the vehicle communication unit 28 after the forced stop condition is met. In this manner, the forklift truck 20 may be forcibly stopped even in a case of a communication failure caused after the forced stop condition is met (after the forced stop signal SG2 is received in the present embodiment).

(22) The vehicle CPU 25 decelerates and forcibly stops traveling of the forklift truck 20 while maintaining the current steering angle based on a state that the forced stop condition is met. According to the configuration, the forklift truck 20 may be forcibly stopped in a state where the actual steering angle is maintained.

The respective embodiments described above may be modified in following manners.

In the first embodiment, the remote CPU 33 sets the steering angle stored in the steering angle storage unit 46 as the steering angle information Dθ in step S212. However, other configurations may be adopted. For example, in such a configuration that the vehicle communication unit 28 periodically transmits a motion status signal including a setting of information associated with the steering angle of the forklift truck 20, and that the remote communication unit 36 receives the motion status signal, the remote CPU 33 may set the steering angle included in the latest operation status signal as the steering angle information Dθ. More specifically, the remote CPU 33 includes an acquisition unit that acquires a steering angle actually set for the forklift truck 20 using the remote communication unit 36, and may be configured to transmit the forced stop remote operation signal SG13 including a setting of the steering angle acquired by the acquisition unit when the forced stop condition is met. In this case, the remote operation program 40 may include a storage unit for storing the steering angle acquired by the acquisition unit, and may eliminate the steering angle storage unit 46.

The operation for determining the steering angle is not limited to the first rotation operation, but may be any operations. For example, the remote CPU 33 may display an area corresponding to the steering angle in the operation image G10, and determine the steering angle based on an manner of operation of an input operation to this area, or may determine the steering angle based on a Si manner of operation of the second rotation operation.

Step S113 performed after execution of steps S304 to S306, steps S307 to S309, and step S309 of the first embodiment may be omitted. In this case, the remote CPU 33 preferably advances the process to step S310 after making an affirmative determination in step S301.

At least either the first start operation or the second start operation may be an operation other than the input operation to the touch panel 31.

For example, when the remote operation device 30 includes an operation button, the second start operation may be an operation of the operation button. In this case, the remote operation device 30 may include a detection unit as an operation detection unit which detects whether or not the operation button has been operated. The second continuous operation continued from the second start operation at the start of the remote operation is an operation which continues operation of the operation button from the start of the remote operation. In a configuration which includes a finger detection sensor provided on a rear surface of the remote operation device 30 to detect a finger, the second start operation may be an operation touching the finger detection sensor. The operation button may be a dedicated button operated for the start operation and the continuous operation, or may be a button used for other purposes.

When an operation other than the input operation to the touch panel 31 is adopted as the second start operation in the manner described above, the first start operation may be an input operation to any region of the entire touch panel 31. Accordingly, the "specified area" includes the entire touch panel 31. In this modification, the first continuous operation may be an operation meeting the conditions (A) and (C).

The first continuous operation may be limited to an input operation to the inside of the first area A1. Specifically, the remote CPU 33 may determine that the first continuous operation is not performed when the first continuous operation position is located outside the first area A1.

The first continuous operation position may be adopted as the manner of operation of the first continuous operation instead of the relative positions of the first start position P10 and the first continuous operation position. For example, in the travel mode, the remote CPU 33 may set the traveling operation information D1 corresponding to the forward movement in the case of the input operation to a position above the centerline L, and may set the traveling operation information D1 corresponding to the backward movement in the case of the input operation to a position below the centerline L.

The remote CPU 33 may control the manner of the remote operation based on relative positions of a specified position inside the touch panel 31 instead of the first start position P10, and the first continuous operation position. For example, the remote CPU 33 may determine the travel speed based on the distance between the centerline L and the first continuous operation position in the travel mode. In addition, when a remote operation is started by initially performing an input operation to the inside of the first area A1, and then performing an input operation to the inside of the second area A2, the remote CPU 33 may control the manner of the remote operation based on the position where the input operation is initially made to the inside of the first area A1 rather than the first start position P10 which is the input operation position at the start of the remote operation, and the first continuous operation position.

The specific layout of the operation image G10 may be any layout, and may be changed as necessary.

For example, the first area A1 and the second area A2 may be switched. In this case, the forklift truck 20 may perform a desired motion in accordance with an operation using the right hand in the first embodiment.

The first area A1 and the second area A2 may be disposed apart from each other in the shorter direction, or may be continuously disposed without separation from each other. However, when attention is paid to the fact that use of the both hands are urged for performing operations, it is preferable that the two areas are separated.

Images displayed in the first area A1 may be the same image irrespective of the operation modes.

The second continuous operation may be an input operation to the touch panel 31 and continued from the second start operation (input operation to the inside of the second area A2) at the start of the remote operation in either of cases where the input operation is made to the inside the second area A2 and to the outside the second area A2. In other words, the second operations may be a series of input operations to the touch panel 31 and limited to the inside of the second area A2 before the start of the remote operation, and not limited to the inside of the second area A2 after the start of the remote operation.

According to the configuration adopted in each of the embodiments, the travel speed, the stroke amount, or the inclination angle increases as the distance between the first start position P10 and the first continuous operation position in the shorter direction of the touch panel 31 increases. However, other configurations may be adopted. The manner of the remote operation of the forklift truck 20 may be controlled according to the relative positions of the first start position P10 and the first continuous operation position. Specific manner of setting of the remote operation may be any manners.

The remote CPU 33 of the first embodiment may determine the steering angle based on the swipe direction from the first start position P10 in the longer direction of the touch panel 31, and the distance between the first start position P10 in this longer direction and the first continuous operation position. In this case, the remote CPU 33 is not required to determine the steering angle based on the first rotation operation.

The operation mode switching condition is a condition in which the switching operation is performed in the situation of the in-stop mode. However, other the configuration may be adopted. For example, the operation mode switching condition may be a condition that the switching operation is performed irrespective of the control mode.

In addition, the switching operation is not limited to the input operation to the respective mode setting areas A3 and A4, but may be any operations. For example, when the remote operation device 30 includes an operation mode switching button, the switching operation may be an operation of the switching button, or the second rotation operation.

When it is determined that both the start operations and the switching operation have been both performed, the remote CPU 33 can determine that an erroneous operation has been made, and prohibit both switching of the operation mode, and a shift of the control mode from the in-stop mode to the operation mode.

The remote operation signal SG1 includes a setting of "0" as information other than information associated with the operation target. However, "null" may be set instead of "0", for example.

According to the configuration of the second embodiment, the vehicle control mode is shifted from the remote movable mode to the remote stop mode after the forced stop control. However, instead of the configuration, the forced stop control may be performed after the shift to the vehicle control mode. In short, the forklift truck 20 is only required to prohibit (invalidate) a remote operation using the remote operation device 30 during the forced stop control.

The forced stop condition is not limited to the condition that at least one of both the continuous operations is no longer performed, and may be any conditions. For example, the forced stop condition may be a condition that a communication failure occurs between the communication units 28 and 36, or that an abnormality of the forklift truck 20 is detected by the vehicle state detection unit 27. Furthermore, the forced stop condition may be a condition that a collision sensor, a human detection sensor, or the like is activated when these sensors are provided on the forklift truck 20.

According to the second embodiment, the remote operation start condition is a condition that the start signal SG3 has been received. However, the remote operation start condition is not limited to this condition and may be any conditions. For example, the remote operation start condition may be a case where a remote operation start switch provided on the forklift truck 20 is operated in a communicable state between the communication units 28 and 36.

The remote operation start condition may be a condition that either the first start operation or the second start operation is performed. Accordingly, the "start operation" is at least either the first start operation or the second start operation.

Similarly, the condition for continuing the remote operation may be a condition that either the first continuous operation or the second continuous operation is performed. Furthermore, the remote operation start condition is not limited to the condition that an operation is performed for the remote operation device 30, and may be a condition that communication between the communication units 28 and 36 is established, for example.

For example, when the forced stop control is performed based on an abnormality in the forklift truck 20, the vehicle CPU 25 may be configured to maintain the remote stop mode as the vehicle control mode even in a case where the start signal SG3 has been received by the vehicle communication unit 28.

The remote CPU 33 of the first embodiment may suspend the forced stop control and restart the remote operation based on execution of both the start operations during the forced stop control. Similarly, the vehicle CPU 25 of the second embodiment may suspend the forced stop control and restart the remote operation based on reception of the start signal SG3 during the forced stop control.

The specific processing configuration for stopping the remote operation by the remote operation device 30 in the industrial vehicle remote operation system 10 may be any configurations. For example, the remote operation device 30 may transmit the forced stop remote operation signal SG13 irrespective of the operation performed for the remote operation device 30 as in the first embodiment, or the forklift truck 20 may be configured so as not to perform a motion corresponding to the remote operation signal SG1 as in the second embodiment. Other configurations may be adopted instead of these configurations.

The industrial vehicle is not limited to the forklift truck 20 and may be any vehicles, such as an automated guided vehicle. Alternatively, the industrial vehicle may be an industrial vehicle which does not have a driving target other than traveling. In other words, the motion drive unit used for motions different from traveling is not essential.

The communication method between the communication units 28 and 36 is not limited to wireless communication, and may be wired communication.

The position detection unit 35 detects the first rotation operation in a state where the thickness direction of the remote operation device 30 crosses or is orthogonal to the vertical direction, but is not required to detect the first rotation operation in a state where the thickness direction of the remote operation device 30 is aligned with the vertical direction. Generally, the thickness direction of the remote operation device 30 automatically crosses or becomes orthogonal to the vertical direction in many cases when the remote operation device 30 is held with both hands to allow visual recognition of the touch panel 31. Accordingly, even when the first rotation operation is not detected in a state of alignment between the thickness direction of the remote operation device 30 and the vertical direction, a problem is unlikely to occur.

The remote CPU 33 is configured to execute both display control of the touch panel 31 and remote operation control of the forklift truck 20. However, other configurations may be adopted. A different control unit (CPU) for performing display control of the touch panel 31 may be provided separately from the remote CPU 33. In short, it is only required that display control and remote operation control are executed by the entire remote operation device 30.

The industrial vehicle remote operation system 10 may constantly allow execution of the remote operation, or is not required to execute the forced stop control based on a state that at least one of both the continuous operations is no longer performed while the remote operation program 40 is activated. Accordingly, the in-stop mode and the forced stop mode may be omitted. The "forced stop control unit" and the "remote operation control unit" are not essential.

The remote operation program 40 may be stored in the vehicle memory 26. In this case, the remote CPU 33 periodically transmits, to the vehicle communication unit 28, an operation signal which includes a setting of information associated with various operations performed for the remote operation device 30 (e.g., information associated with the position of the remote operation device 30 and the position of the input operation to the touch panel 31). The vehicle CPU 25 may determine the manner of the remote operation and the control mode by executing the remote operation control process based on the operation signal described above, and may control the remote operation device 30 by controlling the actuators 23 and 24, or transmitting a signal including a setting of the determined control mode information to the remote operation device 30. In the configuration, the vehicle CPU 25 corresponds to the "remote operation control unit". The specific configuration for determining the manner of the remote operation and the control mode based on the operation signal described above is similar to the corresponding configuration described in the first embodiment and the like.

The industrial vehicle remote operation system 10 may be configured such that a remote operation associated with traveling is prohibited, and that a remote control associated with the forks 22 is allowed in a situation where the forced stop control associated with traveling is performed.

The forced stop remote operation signal SG13 may include settings of the steering angle of the forklift truck 20 formed when the forced stop condition is met, and the forced stop speed. In this case, the forklift truck 20 may perform the forced stop based on the forced stop remote operation signal SG13. The forced stop speed is "0", for example. In short, the specific configuration of the forced stop remote operation signal SG13 may be any configurations as long as the forced stop remote operation signal SG13 is the remote operation signal SG1 for stopping traveling of the forklift truck 20 or a motion of the forks 22.

The respective embodiments and the other modifications may be appropriately combined.

Next, a technical idea or a suitable modification which may occur in the light of the respective embodiments and the respective other examples described above will be hereinafter described.

(A) A remote operation control unit preferably includes a determination unit that determines whether or not a remote operation start condition is met during forced stop control, and suspends the forced stop control to perform a remote operation corresponding to an operation performed for a remote operation device when it is determined that the remote operation start condition is met by the determination unit during the forced stop control.

REFERENCE SIGNS LIST

10 industrial vehicle remote operation system
20 forklift truck (industrial vehicle)
22 forks
23 travel actuator
24 load actuator
25 vehicle CPU
28 vehicle communication unit
29 signal converting unit
30 remote operation device
31 touch panel
32 touch sensor
33 remote CPU
36 remote communication unit
40 remote operation program (industrial vehicle remote operation program)
41 remote operation control processing execution program
46 steering angle storage unit
P10 first start position (position of first start operation when remote operation is started)
P20 second start position (position of second start operation when remote operation is started)
G10 operation image
A1 first area (specified area)
A2 second area
A3 traveling mode setting area
A4 load-handling mode setting area
SG1 remote operation signal
SG13 forced stop remote operation signal

The invention claimed is:

1. An industrial vehicle remote operation system comprising:
   an industrial vehicle that includes a vehicle communication interface;
   a remote operation terminal for a user to remotely operate the industrial vehicle, wherein the remote operation terminal includes a remote communication interface that performs wireless communication with the vehicle communication interface, and a memory that stores a program, and a remote processor that executes the stored program so as to:
   determine whether a forced stop condition is met during a remote operation of traveling of the industrial vehicle;
   store the steering angle of the industrial vehicle formed when the forced stop condition is met;
   when the forced stop condition is met, perform a forced stop control such that a remote operation corresponding to an operation performed for the remote operation terminal is not performed during the forced stop control, and decelerate and forcibly stop traveling of the industrial vehicle while maintaining the steering angle of the industrial vehicle formed when the forced stop condition was met;
   wherein
   when the forced stop condition is met, transmit a forced stop remote operation signal to the industrial vehicle, wherein the forced stop remote operation signal includes settings of (i) at least one of a forced stop speed or a forced stop deceleration, and (ii) the stored steering angle of the industrial vehicle formed when the forced stop condition was met,
   when the vehicle communication interface receives the forced stop remote operation signal, the industrial vehicle is forcibly stopped based on the settings of (i) at least either the forced stop speed or the forced stop deceleration included in the forced stop remote operation signal, and (ii) the stored steering angle,
wherein:
the remote processor starts a remote operation of the industrial vehicle using the remote operation terminal based on a state where a first start operation and a second start operation are performed for the remote operation terminal,
the forced stop condition is a condition that at least either a first continuous operation continued from the first start operation performed when the remote operation is started, or a second continuous operation continued from the second start operation performed when the remote operation is started, is no longer performed for the remote operation terminal, and
wherein
the remote operation terminal includes:
a touch panel;
a touch sensor that configured to detect an input operation to the touch panel; and
a display configured to display an operation image on the touch panel,
the operation image has a first area and a second area disposed at different positions,
the first start operation is an input operation to an inside of the first area,
the first continuous operation is an input operation made to the touch panel and continued from the input operation to the inside of the first area when the remote operation is started,
the second start operation is an input operation made to an inside of the second area, and
the second continuous operation is an input operation made to the touch panel and continued from the input operation to the inside of the second area when the remote operation is started.

2. The industrial vehicle remote operation system according to claim 1, wherein
the remote processor continues the state where the remote operation corresponding to the operation performed for the remote operation terminal is not performed until a remote operation start condition is met after an end of the forced stop control.

3. The industrial vehicle remote operation system according to claim 1, wherein
the remote processor determines whether or not a remote operation start condition is met during the forced stop control,
when the remote operation start condition is met during the forced stop control, perform the remote operation corresponding to the operation performed for the remote operation terminal after an end of the forced stop control, and
when the remote operation start condition is not met during the forced stop control, continue the state where the remote operation corresponding to the operation performed for the remote operation terminal is not performed after an end of the forced stop control.

4. The industrial vehicle remote operation system according to claim 3, wherein
the remote processor performs the remote operation corresponding to the operation performed for the remote operation terminal when a start operation is performed for the remote operation terminal in such a situation that the state where the remote operation corresponding to the operation performed for the remote operation terminal is not performed continues after the end of the forced stop control.

5. An industrial vehicle remote operation system comprising:
an industrial vehicle that includes a vehicle communication interface, a memory that stores a program, and a vehicle processor that executes the stored program;
a remote operation terminal for a user to remotely operate the industrial vehicle, wherein the remote operation terminal includes a remote communication interface that performs wireless communication with the vehicle communication interface, a memory that stores a program, and a remote processor that executes the stored program in order to:
determine whether a forced stop condition is met during a remote operation of traveling of the industrial vehicle;
the vehicle processor executes the stored program in order to:
when the forced stop condition is met, perform a forced stop control such that a remote operating corresponding to an operation performed for the remote operation terminal is not performed during the forced stop control; and
decelerate and forcibly stop traveling of the industrial vehicle while maintaining a current steering angle based on a state that the forced stop condition is met,
wherein:
the remote processor starts a remote operation of the industrial vehicle using the remote operation terminal based on a state where a first start operation and a second start operation are performed for the remote operation terminal,
the forced stop condition is a condition that at least either a first continuous operation continued from the first start operation performed when the remote operation is started, or a second continuous operation continued from the second start operation performed when the remote operation is started, is no longer performed for the remote operation terminal, and
wherein
the remote operation terminal includes:
a touch panel;
a touch sensor that configured to detect an input operation to the touch panel; and
a display configured to display an operation image on the touch panel,
the operation image has a first area and a second area disposed at different positions,
the first start operation is an input operation to an inside of the first area,
the first continuous operation is an input operation made to the touch panel and continued from the input operation to the inside of the first area when the remote operation is started,
the second start operation is an input operation made to an inside of the second area, and
the second continuous operation is an input operation made to the touch panel and continued from the input operation to the inside of the second area when the remote operation is started.

6. The industrial vehicle remote operation system according to claim 5, wherein
the touch panel has a shape that has a longer direction and a shorter direction, and the first area and the second area are so disposed as to be opposite to each other in the longer direction of the touch panel.

7. The industrial vehicle remote operation system according to claim 1, wherein
the remote operation terminal is a smartphone or a tablet terminal.

8. A remote operation terminal used for remotely operating an industrial vehicle having a vehicle communication interface, the remote operation terminal comprising:
a remote communication interface configured to perform wireless communication with the vehicle communication interface;
a memory that stores a program; and
a remote processor that executes the stored program so as
determine whether a forced stop condition is met during a remote operation of traveling of the industrial vehicle;
store the steering angle of the industrial vehicle formed when the forced stop condition is met;
when the forced stop condition is met, perform a forced stop control such that a remote operation corresponding to an operation performed for the remote operation terminal is not performed during the forced stop control, and decelerate and forcibly stop traveling of the industrial vehicle while maintaining the steering angle of the industrial vehicle formed when the forced stop condition was met,
wherein
when the forced stop condition is met, transmit a forced stop remote operation signal to the industrial vehicle, wherein the forced stop remote operation signal includes settings of (i) at least one of a forced stop speed or a forced stop deceleration, and (ii) the stored steering angle of the industrial vehicle formed when the forced stop condition was met,
when the vehicle communication interface receives the forced stop remote operation signal, the industrial vehicle is forcibly stopped based on the settings of (i) at least either the forced stop speed or the forced stop deceleration included in the forced stop remote operation signal, and (ii) the stored steering angle,
wherein:
the remote processor starts a remote operation of the industrial vehicle using the remote operation terminal based on a state where a first start operation and a second start operation are performed for the remote operation terminal,
the forced stop condition is a condition that at least either a first continuous operation continued from the first start operation performed when the remote operation is started, or a second continuous operation continued from the second start operation performed when the remote operation is started, is no longer performed for the remote operation terminal, and
wherein
the remote operation terminal includes:
a touch panel;
a touch sensor that configured to detect an input operation to the touch panel; and
a display configured to display an operation image on the touch panel,
the operation image has a first area and a second area disposed at different positions,
the first start operation is an input operation to an inside of the first area, the first continuous operation is an input operation made to the touch panel and continued from the input operation to the inside of the first area when the remote operation is started,
the second start operation is an input operation made to an inside of the second area, and
the second continuous operation is an input operation made to the touch panel and continued from the input operation to the inside of the second area when the remote operation is started.

9. A non-transitory computer-readable storage medium storing therein an industrial vehicle remote operation program used for remotely operating an industrial vehicle having a vehicle communication interface, the remote operation being performed by using a remote operation terminal that includes a remote communication interface performing wireless communication with the vehicle communication interface, wherein
the remote operation terminal or the industrial vehicle comprises a memory that stores a program, and a processor that executes the stored program so as to:
determine whether a forced stop condition is met during a remote operation of traveling of the industrial vehicle;
store the steering angle of the industrial vehicle formed when the forced stop condition is met;
when the forced stop condition is met, perform a forced stop control such that a remote operation corresponding to an operation performed for the remote operation terminal is not performed during the forced stop control, and decelerate and forcibly stop traveling of the industrial vehicle while maintaining the steering angle of the industrial vehicle formed when the forced stop condition was met,
wherein
when the forced stop condition is met, set (i) at least one of a forced stop speed or a forced stop deceleration, and (ii) the stored steering angle of the industrial vehicle formed when the forced stop condition was met,
forcibly stop the industrial vehicle based on the settings of (i) at least either the forced stop speed or the forced stop deceleration, and (ii) the stored steering angle,
wherein:
the processor starts a remote operation of the industrial vehicle using the remote operation terminal based on a state where a first start operation and a second start operation are performed for the remote operation terminal,
the forced stop condition is a condition that at least either a first continuous operation continued from the first start operation performed when the remote operation is started, or a second continuous operation continued from the second start operation performed when the remote operation is started, is no longer performed for the remote operation terminal, and
wherein
the remote operation terminal includes:
a touch panel;
a touch sensor that configured to detect an input operation to the touch panel; and
a display configured to display an operation image on the touch panel,
the operation image has a first area and a second area disposed at different positions,
the first start operation is an input operation to an inside of the first area, the first continuous operation is an input operation made to the touch panel and continued from the input operation to the inside of the first area when the remote operation is started, the second start operation is an input operation made to an inside of the second area, and the second continuous operation is an input operation made to the touch panel and continued from the input operation to the inside of the second area when the remote operation is started.

10. An industrial vehicle remote operation method for remotely operating an industrial vehicle by using a remote operation terminal that includes a remote communication interface performing wireless communication with a vehicle communication interface provided on the industrial vehicle, the method comprising:

determining whether a forced stop condition is met during a remote operation of traveling of the industrial vehicle;

storing the steering angle of the industrial vehicle formed when the forced stop condition is met;

when the forced stop condition is met, performing a forced stop control such that a remote operation corresponding to an operation performed for the remote operation terminal is not performed during the forced stop control, and the remote operation terminal or the industrial vehicle decelerating and forcibly stopping traveling of the industrial vehicle while maintaining the steering angle of the industrial vehicle formed when the forced stop condition was met, wherein when the forced stop condition is met, setting (i) at least one of a forced stop speed or a forced stop deceleration, and (ii) the stored steering angle of the industrial vehicle formed when the forced stop condition was met, forcibly stopping the industrial vehicle based on the settings of (i) at least either the forced stop speed or the forced stop deceleration, and (ii) the stored steering angle, wherein:

a remote operation of the industrial vehicle is started using the remote operation terminal based on a state where a first start operation and a second start operation are performed for the remote operation terminal, the forced stop condition is a condition that at least either a first continuous operation continued from the first start operation performed when the remote operation is started, or a second continuous operation continued from the second start operation performed when the remote operation is started, is no longer performed for the remote operation terminal, and wherein the remote operation terminal includes:

a touch panel;

a touch sensor that configured to detect an input operation to the touch panel; and a display configured to display an operation image on the touch panel, the operation image has a first area and a second area disposed at different positions, the first start operation is an input operation to an inside of the first area, the first continuous operation is an input operation made to the touch panel and continued from the input operation to the inside of the first area when the remote operation is started, the second start operation is an input operation made to an inside of the second area, and the second continuous operation is an input operation made to the touch panel and continued from the input operation to the inside of the second area when the remote operation is started.

11. An industrial vehicle that includes a vehicle communication interface configured to perform wireless communication with a remote communication interface provided on a remote operation terminal and is remotely operated by the remote operation terminal, the industrial vehicle comprising:

a memory that stores a program, and a processor that executes the stored program so as to:

determine whether a forced stop condition is met during a remote operation of traveling of the industrial vehicle;

store the steering angle of the industrial vehicle formed when the forced stop condition is met;

when the forced stop condition is met, perform a forced stop control such that a remote operation corresponding to an operation performed for the remote operation terminal is not performed during the forced stop control, and decelerate and forcibly stop traveling of the industrial vehicle while maintaining the steering angle of the industrial vehicle formed when the forced stop condition was met, wherein when the forced stop condition is met, set (i) at least one of a forced stop speed or a forced stop deceleration, and (ii) the stored steering angle of the industrial vehicle formed when the forced stop condition was met, forcibly stop the industrial vehicle based on the settings of (i) at least either the forced stop speed or the forced stop deceleration, and (ii) the stored steering angle, wherein:

the processor starts a remote operation of the industrial vehicle using the remote operation terminal based on a state where a first start operation and a second start operation are performed for the remote operation terminal, the forced stop condition is a condition that at least either a first continuous operation continued from the first start operation performed when the remote operation is started, or a second continuous operation continued from the second start operation performed when the remote operation is started, is no longer performed for the remote operation terminal, and wherein the remote operation terminal includes:

a touch panel;

a touch sensor that configured to detect an input operation to the touch panel; and a display configured to display an operation image on the touch panel, the operation image has a first area and a second area disposed at different positions, the first start operation is an input operation to an inside of the first area, the first continuous operation is an input operation made to the touch panel and continued from the input operation to the inside of the first area when the remote operation is started, the second start operation is an input operation made to an inside of the second area, and the second continuous operation is an input operation made to the touch panel and continued from the input operation to the inside of the second area when the remote operation is started.

\* \* \* \* \*